US010591922B2

(12) United States Patent
Sakai et al.

(10) Patent No.: US 10,591,922 B2
(45) Date of Patent: Mar. 17, 2020

(54) AUTONOMOUS VEHICLE OPERATION IN VIEW-OBSTRUCTED ENVIRONMENTS

(71) Applicant: Toyota Motor Engineering & Manufacturing North America, Inc., Erlanger, KY (US)

(72) Inventors: Katsuhiro Sakai, Ann Arbor, MI (US); Danil V. Prokhorov, Canton, MI (US); Bunyo Okumura, Ann Arbor, MI (US); Naoki Nagasaka, Ann Arbor, MI (US); Masahiro Harada, Novi, MI (US); Nobuhide Kamata, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 261 days.

(21) Appl. No.: 15/461,316

(22) Filed: Mar. 16, 2017

(65) Prior Publication Data

US 2017/0185088 A1 Jun. 29, 2017

Related U.S. Application Data

(62) Division of application No. 14/609,273, filed on Jan. 29, 2015, now Pat. No. 9,649,979.

(51) Int. Cl.
*G05D 1/02* (2020.01)
*B60Q 9/00* (2006.01)
(Continued)

(52) U.S. Cl.
CPC ........... *G05D 1/0223* (2013.01); *B60Q 9/008* (2013.01); *B60W 30/00* (2013.01); *B60W 40/00* (2013.01);
(Continued)

(58) Field of Classification Search
CPC .... G05D 1/0223; G05D 1/0088; B60Q 9/008; B60W 30/00; B60W 40/00;
(Continued)

(56) References Cited

U.S. PATENT DOCUMENTS 5,668,739 A 9/1997 League et al.
5,926,126 A 7/1999 Engelman
(Continued)

FOREIGN PATENT DOCUMENTS

CN 1179217 A 4/1998
CN 1882458 A 12/2006
(Continued)

*Primary Examiner* — Richard A Goldman
(74) *Attorney, Agent, or Firm* — Christopher G. Darrow; Darrow Mustafa PC

(57) ABSTRACT

Arrangements related to operating an autonomous vehicle in view-obstructed environments are described. At least a portion of an external environment of the autonomous vehicle can be sensed to detect one or more objects located therein. An occupant viewable area of the external environment can be determined. It can be determined whether one or more of the detected one or more objects is located outside of the determined occupant viewable area. Responsive to determining that a detected object is located outside of the determined occupant viewable area, one or more actions can be taken. For instance, the action can include presenting an alert within the autonomous vehicle. Alternatively or in addition, the action can include causing a current driving action of the autonomous vehicle to be modified.

18 Claims, 9 Drawing Sheets

(51) Int. Cl.
*B60W 30/00* (2006.01)
*B60W 40/00* (2006.01)
*G06K 9/00* (2006.01)
*G08G 1/16* (2006.01)
*B60W 50/00* (2006.01)
*G05D 1/00* (2006.01)

(52) U.S. Cl.
CPC .... *B60W 50/0097* (2013.01); *B60W 50/0098* (2013.01); *G05D 1/0088* (2013.01); *G06K 9/00805* (2013.01); *G06K 9/00832* (2013.01); *G08G 1/165* (2013.01); *G08G 1/166* (2013.01); *B60W 2420/42* (2013.01); *B60W 2510/101* (2013.01); *B60W 2510/18* (2013.01); *B60W 2510/20* (2013.01); *B60W 2520/04* (2013.01); *B60W 2550/10* (2013.01); *B60W 2710/1005* (2013.01); *B60W 2710/18* (2013.01); *B60W 2710/20* (2013.01); *G05D 2201/0212* (2013.01)

(58) Field of Classification Search
CPC ......... B60W 50/0097; B60W 50/0098; B60W 50/14; B60W 2420/42; B60W 2510/101; B60W 2510/18; B60W 2510/20; B60W 2520/04; B60W 2550/10; B60W 2710/1005; B60W 2710/18; B60W 2710/20; G06K 9/00805; G06K 9/00832; G08G 1/165; G08G 1/166; G08G 1/167; G08G 1/16; B60R 1/081
USPC ........... 701/100, 23, 301, 41, 45, 93, 117, 3; 60/239, 39.282
See application file for complete search history.

(56) References Cited

U.S. PATENT DOCUMENTS

| | | | |
|---|---|---|---|
| 6,176,587 B1 | 1/2001 | Fredricks | |
| 6,438,491 B1 | 8/2002 | Farmer | |
| 6,501,536 B1* | 12/2002 | Fredricks | B60R 1/02 180/271 |
| 6,882,287 B2 | 4/2005 | Schofield | |
| 7,038,577 B2 | 5/2006 | Pawlicki et al. | |
| 7,379,813 B2 | 5/2008 | Kubota et al. | |
| 7,499,774 B2 | 3/2009 | Barrett et al. | |
| 7,720,580 B2 | 5/2010 | Higgins-Luthman | |
| 7,908,060 B2 | 3/2011 | Basson et al. | |
| 8,031,062 B2* | 10/2011 | Smith | G08G 1/166 340/438 |
| 8,058,980 B2 | 11/2011 | Yanagi et al. | |
| 8,072,351 B1* | 12/2011 | Absher, II | B60Q 9/008 340/425.5 |
| 8,190,355 B2 | 5/2012 | Emam et al. | |
| 8,362,889 B2 | 1/2013 | Komori | |
| 8,489,284 B2 | 7/2013 | Emam et al. | |
| 8,589,014 B2 | 11/2013 | Fairfield et al. | |
| 8,645,001 B2 | 2/2014 | Basson et al. | |
| 8,676,431 B1* | 3/2014 | Mariet | B60T 7/22 701/28 |
| 8,874,267 B1* | 10/2014 | Dolgov | G08G 1/16 700/255 |
| 8,874,301 B1* | 10/2014 | Rao | B60K 28/066 701/25 |
| 9,019,090 B2 | 4/2015 | Weller et al. | |
| 9,037,323 B2* | 5/2015 | Kumar | B61C 17/12 246/182 B |
| 9,153,133 B1* | 10/2015 | Lunsford | G08G 1/167 |
| 9,159,235 B2 | 10/2015 | Hegemann et al. | |
| 9,221,396 B1* | 12/2015 | Zhu | B60Q 9/008 |
| 9,248,834 B1 | 2/2016 | Ferguson et al. | |
| 9,931,985 B1* | 4/2018 | Pertsel | B60R 1/081 |
| 10,011,216 B1* | 7/2018 | Rovik | B60Q 1/346 |
| 2002/0005778 A1* | 1/2002 | Breed | B60Q 9/008 340/435 |
| 2003/0093209 A1* | 5/2003 | Andersson | B60K 31/0058 701/93 |
| 2003/0191573 A1* | 10/2003 | Beyer | B60T 8/17555 701/70 |
| 2006/0070787 A1* | 4/2006 | Bartels | G01S 13/931 180/271 |
| 2006/0208169 A1* | 9/2006 | Breed | B60N 2/002 250/221 |
| 2008/0040004 A1* | 2/2008 | Breed | B60R 21/0134 701/45 |
| 2008/0204557 A1* | 8/2008 | Kubota | B60R 1/00 348/148 |
| 2008/0243390 A1* | 10/2008 | Nakamori | G06K 9/00805 701/301 |
| 2009/0037104 A1* | 2/2009 | Basson | G01C 21/20 701/431 |
| 2009/0096597 A1 | 4/2009 | Avery, Jr. et al. | |
| 2009/0312912 A1* | 12/2009 | Braegas | B60T 7/22 701/42 |
| 2010/0049393 A1* | 2/2010 | Emam | G08G 1/161 701/31.4 |
| 2010/0265600 A1* | 10/2010 | Okuda | B60R 1/02 359/843 |
| 2012/0089293 A1* | 4/2012 | Halder | B60W 50/0205 701/24 |
| 2012/0123650 A1* | 5/2012 | Diekhans | A01D 43/085 701/50 |
| 2012/0166058 A1* | 6/2012 | Armbrust | B60Q 1/525 701/96 |
| 2012/0191315 A1* | 7/2012 | Fehse | G08G 1/168 701/70 |
| 2013/0116895 A1* | 5/2013 | Smith | A01F 15/08 701/50 |
| 2013/0151058 A1* | 6/2013 | Zagorski | B60W 30/09 701/23 |
| 2013/0169425 A1 | 7/2013 | Victor et al. | |
| 2013/0261869 A1* | 10/2013 | Brenneis | B60W 50/0205 701/23 |
| 2014/0071278 A1* | 3/2014 | Assaf | B60R 1/12 348/148 |
| 2014/0114536 A1* | 4/2014 | Kobana | B60K 28/06 701/49 |
| 2014/0148988 A1* | 5/2014 | Lathrop | B60W 50/10 701/23 |
| 2014/0163805 A1* | 6/2014 | Braunstein | G05D 1/0276 701/23 |
| 2014/0185311 A1* | 7/2014 | Sharghi | B60R 1/00 362/520 |
| 2014/0214255 A1 | 7/2014 | Dolgov et al. | |
| 2014/0214259 A1 | 7/2014 | Trepagnier et al. | |
| 2014/0249722 A1* | 9/2014 | Hegemann | G08G 1/16 701/41 |
| 2014/0324339 A1* | 10/2014 | Adam | G01S 13/726 701/519 |
| 2015/0259007 A1* | 9/2015 | Di Cairano | B62D 15/025 701/41 |
| 2015/0293534 A1* | 10/2015 | Takamatsu | B60W 30/00 701/28 |
| 2016/0001781 A1* | 1/2016 | Fung | B60W 40/08 701/36 |
| 2016/0046232 A1* | 2/2016 | Guy | B60Q 1/525 340/436 |
| 2016/0071418 A1* | 3/2016 | Oshida | G08G 1/22 701/23 |
| 2016/0090043 A1* | 3/2016 | Kim | B60R 1/081 701/49 |
| 2016/0107655 A1* | 4/2016 | Desnoyer | B60W 50/14 701/23 |
| 2016/0163217 A1* | 6/2016 | Harkness | G09B 5/06 434/65 |
| 2016/0221500 A1* | 8/2016 | Sakai | B60Q 9/008 |
| 2016/0375767 A1* | 12/2016 | Konet | B60K 35/00 701/23 |

(56) References Cited

U.S. PATENT DOCUMENTS

| | | | |
|---|---|---|---|
| 2016/0378112 A1* | 12/2016 | Ljubuncic | B60W 30/16 701/45 |
| 2017/0088143 A1* | 3/2017 | Goldman-Shenhar | B60K 35/00 |
| 2017/0236413 A1* | 8/2017 | Takagi | B60R 21/00 701/117 |
| 2017/0329001 A1* | 11/2017 | Brandt | G06K 9/00791 |
| 2018/0029609 A1* | 2/2018 | Knoller | B60W 50/0097 |
| 2018/0043829 A1* | 2/2018 | Cordell | B60Q 9/008 |
| 2018/0059661 A1* | 3/2018 | Sato | B60W 40/04 |
| 2018/0178801 A1* | 6/2018 | Hashimoto | B62D 15/025 |
| 2018/0268701 A1* | 9/2018 | Sato | B60K 35/00 |
| 2018/0290593 A1* | 10/2018 | Cho | B60R 1/002 |

FOREIGN PATENT DOCUMENTS

| | | | |
|---|---|---|---|
| CN | 101380951 A | | 3/2009 |
| JP | 2003344539 A | | 12/2003 |
| JP | 2010079565 A | | 4/2010 |
| JP | 2013250689 A | | 12/2013 |

* cited by examiner

AUTONOMOUS VEHICLE OPERATION IN VIEW-OBSTRUCTED ENVIRONMENTS

CROSS-REFERENCE TO RELATED APPLICATIONS

This application is a divisional of U.S. application Ser. No. 14/609,273, filed Jan. 29, 2015, which is hereby incorporated by reference in its entirety.

FIELD

The subject matter described herein relates in general to vehicles having an autonomous operational mode and, more particularly, to the operation of such vehicles in view-obstructed portions of a driving environment.

BACKGROUND

Some vehicles include an operational mode in which a computing system is used to navigate and/or maneuver the vehicle along a travel route with minimal or no input from a human driver. Such vehicles include sensors that are configured to detect information about the surrounding environment, including the presence of objects in the environment. The computing systems are configured to process the detected information to determine how to navigate and/or maneuver the vehicle through the surrounding environment. Due to various reasons, there may be differences between what a human occupant of the vehicle can sense in the surrounding environment and what vehicle sensors can detect in the surrounding environment.

SUMMARY

In one respect, the present disclosure is directed to a method of operating an autonomous vehicle in a view-obstructed environment. The method can include sensing at least a portion of an external environment of the autonomous vehicle to detect one or more objects located therein. The method can also include determining an occupant viewable area of the external environment. The method can further include determining whether one or more of the detected one or more objects is located outside of the determined occupant viewable area. The method can include, responsive to determining that one or more of the detected one or more objects is located outside of the determined occupant viewable area, presenting an alert within the autonomous vehicle.

In another respect, the present disclosure is directed to a system for operating an autonomous vehicle in a view-obstructed environment. The system includes a sensor system and a processor operatively connected to the sensor system. The sensor system can be configured to detect one or more objects located in at least a portion of an external environment of the autonomous vehicle. The processor is programmed to initiate executable operations. The executable operations can include determining an occupant viewable area of the external environment. The executable operations can also include determining whether one or more of the detected one or more objects is located outside of the determined occupant viewable area. The executable operations can further include, responsive to determining that one or more of the detected one or more objects is located outside of the determined occupant viewable area, presenting an alert within the autonomous vehicle.

In still another respect, the present disclosure is directed to a method of operating an autonomous vehicle in a view-obstructed environment. The method can include sensing at least a portion of an external environment of the autonomous vehicle to detect one or more objects located therein. The method can also include determining an occupant viewable area of the external environment. The method can further include determining whether one or more of the detected one or more objects is located outside of the determined occupant viewable area. The method can include, responsive to determining that one or more of the detected one or more objects is located outside of the determined occupant viewable area, causing a modification to a current driving action of the autonomous vehicle.

In a further respect, the present disclosure is directed to a system for operating an autonomous vehicle in a view-obstructed environment. The system includes a sensor system and a processor operatively connected to the sensor system. The sensor system can be configured to detect one or more objects located in at least a portion of an external environment of the autonomous vehicle. The processor is programmed to initiate executable operations. The executable operations can include determining an occupant viewable area of the external environment. The executable operations can also include, determining whether one or more of the detected one or more objects is located outside of the determined occupant viewable area. The executable operations can further include responsive to determining that one or more of the detected one or more objects is located outside of the determined occupant viewable area, causing a modification to a current driving action of the autonomous vehicle.

In still another respect, the present disclosure is directed to a method of operating an autonomous vehicle in a view-obstructed environment. The method can include identifying an information critical area along a current travel route of the vehicle. The information critical area can be related to a future driving action. The method can also include determining an occupant viewable area of the external environment. The method can further include determining whether at least a portion of the information critical area is located outside of the determined occupant viewable area. The method can include, responsive to determining that at least a portion of the information critical area is located outside of the determined occupant viewable area, causing a modification to a current driving action of the autonomous vehicle.

In yet another respect, the present disclosure is directed to a system for operating an autonomous vehicle in a view-obstructed environment. The system can include a processor. The processor is programmed to initiate executable operations. The executable operations can include identifying an information critical area along a current travel route. The information critical area can be related to a future driving action. The executable operations can also include determining an occupant viewable area of the external environment. The executable operations can further include determining whether at least a portion of the information critical area is located outside of the determined occupant viewable area. The executable operations can also include, responsive to determining that at least a portion of the information critical area is located outside of the determined occupant viewable area, causing a modification to a current driving action of the autonomous vehicle.

DETAILED DESCRIPTION

Figure 1:
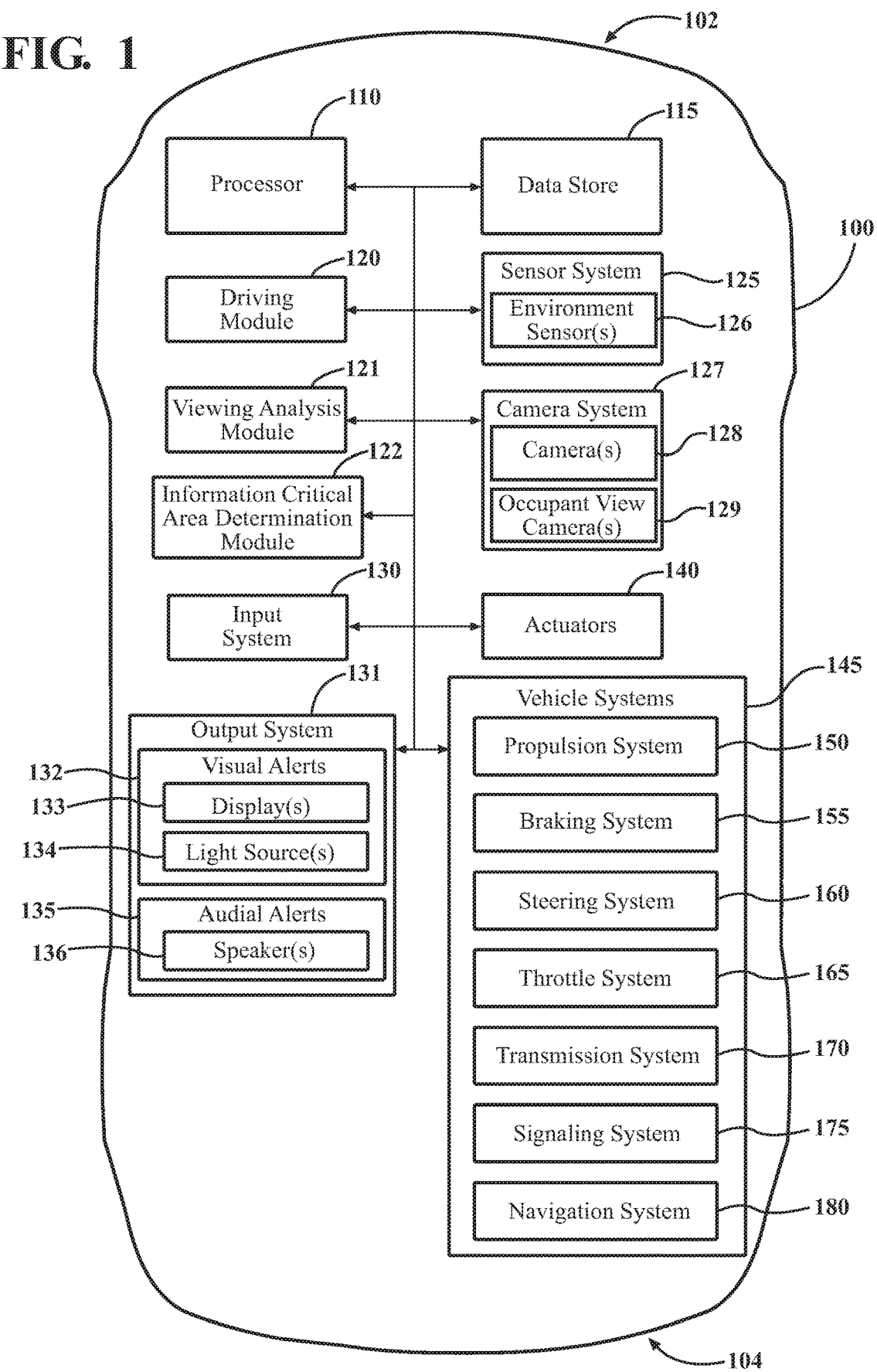
FIG. 1 is an example of an autonomous vehicle.

This detailed description relates to the operation of an autonomous vehicle in view-obstructed environments. In one or more implementations, it can be determined whether objects detected by a sensor system of the autonomous vehicle are located outside of a determined occupant viewable area. In response to determining that an object is located outside of a determined occupant viewable area, the autonomous vehicle can be configured to perform one or more actions, including, for example, presenting an alert within the autonomous vehicle and/or causing a modification to a current driving action of the autonomous vehicle. In one or more implementations, an information critical area along a travel route can be identified. If at least a portion of the information critical area is located outside of a determined occupant viewable area, then a current driving action of the autonomous vehicle can be caused to be modified. The present detailed description relates to systems, methods and computer program products that incorporate such features. In at least some instances, such systems, methods and computer program products can improve occupant confidence in the autonomous operation of the vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In one or more implementations, the vehicle 100 may be a watercraft, an aircraft or any other form of motorized transport. The vehicle 100 can have a front end 102 and a back end 104.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated. In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

The vehicle 100 can include an autonomous driving module 120. The autonomous driving module 120 can be implemented as computer readable program code that, when executed by a processor, implement one or more of the various processes described herein, including, for example, determining a modification to a current driving action of the vehicle 100 and/or causing, directly or indirectly, a current driving action of the vehicle 100 to be modified. The autonomous driving module 120 can be a component of the processor 110, or the autonomous driving module 120 can be executed on and/or distributed among other processing systems to which the processor 110 is operatively connected.

The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 145). Alternatively or in addition, the data store 115 may contain such instructions.

The vehicle 100 can include a viewing analysis module 121. The viewing analysis module 121 can be implemented as computer readable program code that, when executed by a processor, implement one or more of the various processes described herein. The viewing analysis module 121 can be a component of the processor 110, or the viewing analysis module 121 can be executed on and/or distributed among other processing systems to which the processor 110 is operatively connected.

The viewing analysis module 121 can be configured to detect, analyze, assess and/or interpret information about a vehicle occupant and/or an external environment of the vehicle 100 to determine an occupant viewable area. "Occupant viewable area" means a portion of the external environment that is visible to a vehicle occupant. The determination of the occupant vehicle area can be based on one or more factors, including, for example, the location of an occupant within the vehicle 100, obstructions in the external environment (e.g. other vehicles, weather conditions, etc.), obstructions in the vehicle (e.g. portions of the vehicle frame or molding blocking the field of view, window tinting, etc.), seat position (e.g. height, location in a longitudinal direction of the vehicle, reclining position, etc.), human occupant physical measurements (e.g. height), human occupant physical limitations and/or human occupant sensory perception limitations, just to name a few possibilities. The human occupant physical measurement, human occupant physical limitations and/or human occupant sensory perception limitations can be based on data of a particular human being, an average human being, or other data set.

In one or more arrangements, the human occupant physical measurements can be based on actual measurements of one or more features of a human occupant. As an example, one or more images of at least a portion of the body of a human occupant can be captured. For instance, one or more images of at least a portion of the body of a human occupant can be captured by a scanner, camera and/or sensor. The viewing analysis module 121 or other element can include any suitable body recognition software and/or body analysis software. In one or more arrangements, at least a portion of the face of a human occupant can be captured. Facial recognition and/or analysis software can be used to facilitate image capture and/or to analyze captured images. Analyzing the images can include determining or measuring one or more physical features of a human occupant, such as eye size, pupillary distance, distance between the eyes, distance between at least one of the eyes and one or more other facial or body features, distance between at least one of the eyes and a structure within the vehicle, head angles, eye angles, the vertical meridian in each eye, the horizontal meridian in each eye, just to name a few possibilities.

In one or more arrangements, such measurements can be used, at least in part, to determine the occupant viewable area. In one or more arrangements, the occupant viewable area can also be determined by factoring in information/data about the field of vision of a human being. For instance, in one or more arrangements, a predetermined field of human vision can include a set of predetermined vision ranges, which can be based on a particular human being, an average human being, or other data set. As an example, one set of predetermined vision ranges can include: about 60 degrees nasally (e.g. toward the nose or inward) from the vertical meridian in each eye to about 100 degrees temporally (e.g. away from the nose or outward) from the vertical meridian in each eye, and about 60 degrees above and about 75 degrees below the horizontal meridian of each eye.

In one or more arrangements, the viewing analysis module 121 can be configured to determine or account for the actual vision ranges of a human occupant of the vehicle 100 when determining the occupant viewable area. For instance, the viewing analysis module 121 can be configured to obtain, access and/or receive information/data related to one or more aspects of the vision of a human occupant of the vehicle. For instance, the viewing analysis module 121 can be configured to conduct at least a partial visual field test of a human occupant of the vehicle 100. Alternatively or in addition, the viewing analysis module 121 can receive information/data or inputs corresponding to a human occupant's vision, including information/data concerning any medical conditions, corrective lenses, visual acuity, prior vision tests, etc.

The viewing analysis module 121 can be configured to determine the location of an object detected in the external environment relative to the occupant viewable area. More particularly, the viewing analysis module 121 can be configured to determine whether an object detected in the external environment is located outside of the occupant viewable area. Alternatively or in addition, the viewing analysis module 121 can be configured to determine whether at least a portion of an information critical area of the external environment is located outside of the determined occupant viewable area.

The viewing analysis module 121 can include instructions (e.g., program logic) executable by the processor 110. Such instructions can include instructions to determine an occupant viewable area, to determine the location of a detected object relative to the occupant viewable area and/or to determine whether at least a portion of an information critical area is located outside of the determined occupant viewable area. Alternatively or in addition, the data store 115 may contain such instructions.

The vehicle 100 can include an information critical area determination module 122. The information critical area determination module 122 can be implemented as computer readable program code that, when executed by a processor, implement the various processes described herein. The information critical area determination module 122 can be a component of the processor 110, or the information critical area determination module 122 can be executed on and/or distributed among other processing systems to which the processor 110 is operatively connected.

The information critical area determination module 122 can be configured to identify an information critical area along a travel route of the vehicle. "Information critical area" means any portion of an external environment of a vehicle in which information contained therein is critical for a human driver to sense when performing a future driving action. In this context, "critical" means information that is important in determining whether the vehicle can safely and successfully complete a future driving action. The information critical area can change as there are changes in the location, position and/or direction of the vehicle 100.

The information critical area determination module 122 can be operatively connected to a sensor system 125, a camera system 127, a navigation system 180 and/or other element of the vehicle 100 to identify an information critical area. In one or more arrangements, the information critical area determination module 122 can be operatively connected to one or more one or more of the data stores 115, which can include mapping or other data. As the vehicle 100 travels along a travel route, future driving actions that the vehicle 100 will perform along the travel route can be assessed relative to other portions of the external environment.

Various examples of information critical areas are described herein. For instance, if a vehicle is approaching an intersection and a right turn is planned onto a transverse street, then one information critical area would be at least a portion of the transverse street that is located to the left of the intersection. One example of such an area is shown at 950 in FIG. 9 and will be described in greater detail later. The presence or absence of objects in such an area would be critical to the future driving action (e.g. turning right onto the transverse street). In one or more arrangements, the information critical area can be located within a predetermined area or distance. For instance, for the information critical area shown in FIG. 9, the information critical area can extend from the intersection to a predetermined distance away from the intersection. In one or more arrangements, the predetermined distance can be about 50 feet or less, about 75 feet or less, about 100 feet or less, about 150 feet or less, about 200 feet or less, etc.

As noted above, the vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process. The sensor system 125 can have an associated sensor detection area. "Sensor detection area" means a portion of an environment that is located within the range of one or more sensors of a sensor system. The sensor detection area of the sensor system 125 can be determined by, for example, the sensor system 125, the viewing analysis module 121 or other module or element.

In arrangements in which the sensor system 125 includes a plurality of sensors, the sensors can work independently from each other. Alternatively, two or more of the sensors can work in combination with each other. The sensor system 125 and/or the one or more sensors can be operatively connected to the processor 110, the data store 115, the autonomous driving module 120 and/or other element of the vehicle 100.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary object or moving objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an 02 monitor, a fuel gauge, an engine oil temperature, coolant temperature, etc.).

The sensor system 125 can include one or more environment sensors 126. The environment sensors 126 can be configured to detect, determine, assess, monitor, measure, quantify and/or sense objects in at least a portion of the external environment of the vehicle 100 and/or information/data about such objects. The one or more environment sensors 126 can be provided in any suitable location of the vehicle. In one or more arrangements, one or more of the environment sensors 126 can be located toward the front end 102 of the vehicle 100. In one or more arrangements, one or more environment sensors 126 can be located on a left side of the front end 102 of the vehicle 100. Alternatively or in addition, one or more environment sensors 126 can be located on a right side of the front end 102 of the vehicle 100. Additionally or alternatively, one or more environment sensors 126 can be located in any suitable location at or near the back end 104 of the vehicle 100.

Various examples of the environment sensors 126 will be described herein. However, it will be understood that the embodiments are not limited to the particular sensors described.

In one or more arrangements, one or more of the environment sensors 126 can use at least in part radio signals (e.g. RADAR based sensors). The one or more radio-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction, the lateral direction and/or other direction(s)), the speed of each detected object and/or the movement of each detected object.

In one or more arrangements, one or more of the environment sensors 126 can use at least in part lasers. For instance, one or more of the environment sensors 126 can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode. The one or more laser-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction, the lateral direction and/or other direction(s)), the speed of each detected object and/or the movement of each detected object.

In one or more arrangements, one or more of the environment sensors 126 can use at least in part ultrasound. Such sensors can include an ultrasound source configured to emit ultrasonic signals and a detector configured to detect reflections of the ultrasonic signal. The one or more ultrasound-based environment sensors 126 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction, the lateral direction and/or other direction(s)), the speed of each detected object and/or the movement of each detected object. Such detecting can be based on a characteristic (e.g. the intensity) of a reflected ultrasonic signal.

In some arrangements, the sensor system 125, the processor 110, and/or one or more of the modules 120, 121, 122 can be configured to detect, determine, assess, monitor, measure, quantify and/or sense, directly or indirectly, one or more aspects, characteristics and/or properties of a detected object. For example, the sensor system 125, the processor 110, and/or one or more of the modules 120, 121, 122 can be configured to detect, determine, assess, monitor, measure, quantify and/or sense, directly or indirectly, the size, relative size, length, width, height, a dimension, the material, a material property, the speed, the acceleration and/or the trajectory of a detected object.

Alternatively or in addition to any of the sensors described above, the sensor system 125 can include other types of sensors. The sensor system 125, the processor 110, and/or one or more of the modules 120, 121, 122 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

The vehicle 100 can include a camera system 127. In one or more arrangements, the camera system 127 can be a part of the sensor system 125. The camera system 127 can include a one or more cameras 128 and/or one or more occupant view cameras 129. "Camera" is defined as any device, component, and/or system that can capture visual data. "Visual data" includes video and/or image information/data. The visual data can be in any suitable form.

In one or more arrangements, one or more of the cameras 128 and/or one or more of the occupant view cameras 129 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images. One or more of the cameras 128 and/or one or more of the occupant view cameras 129 can be configured with zoom in and/or zoom out capabilities.

In one or more arrangements, one or more of the cameras 128 and/or one or more of the occupant view cameras 129 can be externally facing. "Externally facing" means a camera that is oriented, positioned, configured, operable and/or arranged to capture visual data from at least a portion of the external environment of the vehicle 100. The one or more cameras 128 and/or the one or more occupant view cameras 129 can be located in any suitable portion of the vehicle 100. For instance, one or more of the cameras 128 and/or one or more of the occupant view cameras 129 can be located within the vehicle 100. One or more of the cameras 128 and/or one or more of the occupant view cameras 129 can be located on the exterior of the vehicle 100. One or more of the cameras 128 and/or one or more of the occupant view cameras 129 can be located on or exposed to the exterior of the vehicle 100.

The position of one or more of the cameras 128 and/or one or more of the occupant view cameras 129 can be fixed such that its position does not change relative to the vehicle 100. One or more of the cameras 128 and/or one or more of the occupant view cameras 129 can be movable so that its position can change to allow visual data from different portions of the external environment of the vehicle 100 to be captured. The movement of the cameras 128 and/or the occupant view cameras 129 can be achieved in any suitable manner. For instance, the cameras 128 and/or the occupant view cameras 129 can be rotatable about one or more axes, pivotable, slidable and/or extendable, just to name a few possibilities. In one or more arrangements, the cameras 128 and/or the occupant view cameras 129 can have any suitable range of motion, including, for example, substantially spherical, substantially hemi-spherical, substantially circular and/or substantially linear. As used herein, the term "substantially" includes exactly the term it modifies and slight variations therefrom. Thus, for example, the term "substantially spherical" means exactly spherical and slight variations therefrom.

The one or more cameras 128, the occupant view cameras 129, the movement of the one or more cameras 128 and/or the movement of the one or more occupant view cameras 129 can be controlled by the camera system 127, the sensor system 125, the processor 110 and/or any one or more of the modules 120, 121, 122.

"Occupant view camera" means any camera that is configured, positioned, located, movable and/or oriented to capture, acquire and/or collect visual data of an external environment of a vehicle to determine or assess the portion or portions of the external environment that can actually be seen by a human occupant of the vehicle. The occupant viewable area can be determined by, for example, the viewing analysis module 121 and/or the processor 110. The one or more occupant view cameras 129 can be provided in any suitable location. For instance, the one or more occupant view cameras 129 can be located within the interior of the vehicle 100.

In one or more arrangements, one or more occupant view cameras 129 can be provided to capture, acquire and/or collect visual data so that an occupant viewable area for the driver of the vehicle 100 can be determined. Alternatively or in addition, one or more occupant view cameras 129 can be provided to capture, acquire and/or collect visual data so that an occupant viewable area for a non-driver passenger of the vehicle 100 can be determined.

The viewing analysis module 121 and/or the processor 110 can be configured to analyze visual data captured by the one or more occupant view cameras 129 to determine an occupant viewable area. The viewing analysis module 121 and/or the processor 110 can be configured to analyze information/data captured by the sensor system 125 with respect to detected objects in the external environment and to locate the detected objects relative to the occupant viewable area. The sensor system 125, the viewing analysis module 121 and/or the processor 110 can be configured to determine a sensor detection area. The viewing analysis module 121 and/or the processor 110 can be configured to assess or compare the occupant viewable area and the sensor detection area.

The vehicle 100 can include an input system 130. An "input system" is defined as any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 131. An "output system" is defined as any device, component, system, element or arrangement or groups thereof that enable information/data to be presented to a user (e.g. a person, vehicle occupant, etc.). The output system 131 can include a display, as described above. Alternatively or in addition, the output system 131 may include a microphone, earphone and/or speaker. Some components of the vehicle 100 may serve as both a component of the input system 130 and a component of the output system 131.

In one or more arrangements described herein, at least a portion of the output system 131 can be activated to provide an alert responsive to determining that one or more objects detected in the external environment is located outside of a determined occupant viewable area. The output system 131 can be configured to present an alert to one or more occupants of the vehicle 100. The alert can be any type of alert, including, for example, a visual alert 132. "Visual alert" is any output that provides information in a manner that is perceptible to the human sense of sight. The visual alert 132 can visually alert a vehicle occupant to the presence of an object detected in the external environment of the vehicle 100 that is located outside of the determined occupant viewable area. The visual alert 132 can have any suitable form. The visual alert 132 can be presented by one or more components of the output system 131, such as one or more displays 133 and/or one or more light sources 134 located within the vehicle 100.

A "display" is defined as a component or a group of components that present information/data in visual form, including, for example, video, images, graphics, etc. In one or more arrangements, the display 133 can be located in a front interior portion of a vehicle 100. As an example, the display 133 can be included in a dashboard or instrument panel (not shown) of the vehicle 100.

The display 133 can be any suitable type of display. The display 133 can be any suitable type of display. For instance, the display 133 can be a liquid crystal display (LCD), a light emitting diode (LED) display or some other suitable display. In one or more arrangements, the display 133 can be a touch screen display, a multi-touch display or a remotely controlled display. A touch screen can allow a user to engage or interact with one or more displayed elements, such as a graphical user interface (GUI), and/or other applications running on any vehicle system, including any of those described herein, through contact with the display 133. For example, a user may make selections and move a cursor by simply touching the display 133 via a finger or stylus.

The visual alert 132 can have any suitable form. In one or more arrangements, the visual alert 132 can be a word, a phrase or a message presented on the display 133. In one or more arrangements, the visual alert 132 can include representations of one or more items. For instance, the visual alert 132 can include a representation of the external environment. The representation of the external environment can present graphical, photographic, video and/or map information or data, which can be obtained from any suitable source, including, for example, from the data store 115, the navigation system 180 and other source to which one or more elements of the vehicle 100 are operatively connected. Such visual information/data can be presented in real-time on the display 133.

The visual alert 132 can include a representation of the one or more objects detected in the external environment. The visual alert 132 can include a representation of the occupant viewable area. The visual alert 132 can include a representation of the sensor detection area of the external environment. In one or more arrangements, the representation of the one or more objects, the representation of the occupant viewable area and/or the representation of the sensor detection area can be overlaid upon the representation of the external environment.

Alternatively or in addition, the visual alert 132 can be presented by one or more light sources 134. The one or more light sources 134 can generate or emit any type of light energy. In one or more arrangements, the one or more light sources 134 can be electric-powered. In one or more arrangements, the one or more light sources 134 can include one or more of the following types of electric-powered light sources: electron-stimulated, incandescent lamps, electroluminescent (EL) lamps, gas discharge lamps, high-intensity discharge lamps and/or lasers, just to name a few possibilities. In one or more arrangements, the one or more light sources 134 can be light emitting diodes (LEDs). For instance, the one or more light sources 134 can be organic LEDs, polymer LEDs, solid state lighting, LED lamps, and/or active-matrix organic LEDs. In some arrangements, the one or more light sources 134 can be the same type of light source. In other arrangements, one or more of the one or more light sources 134 can be a different type of light source than the other light sources.

Alternatively or in addition being a visual alert 132, the alert can be an audial alert 135. "Audial alert" is any output that provides information in a manner that is perceptible to the human sense of hearing. The audial alert 135 can inform a vehicle occupant to the presence of an object detected in the external environment of the vehicle 100 that is located outside of the determined occupant viewable area. The audial alert 135 can have any suitable form. The audial alert 135 can be presented by one or more components of the output system 131, such as by being emitted over one or more speakers 136 or over one or more in-vehicle audio channels. In such case, the audial alert can be a sound, a plurality of sounds, a word, a phrase or a message.

The audial alert 135 can be presented by one or more components of the output system 131, such as by being emitted over one or more speakers 136. "Speaker" means one or more elements, one or more devices, one or more components, one or more systems, and/or any combination thereof that produce sound in response to an audio signal input. Examples of speakers include, for example, electroacoustic transducers, sound chips, and sound cards. Each speaker can have one or more audio output channels (not shown) operatively connected thereto. "Audio output channel" means any suitable device, component or structure for carrying audio signals.

The vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 150. The propulsion system 150 can include one or more mechanisms, devices, elements, components, systems, and/or combinations thereof, now known or later developed, configured to provide powered motion for the vehicle 100. The propulsion system 150 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include wheels, tires and/or tracks. Any suitable type of wheels, tires and/or tracks can be used. In one or more arrangements, the wheels, tires and/or tracks of the vehicle 100 can be configured to rotate differentially with respect to other wheels, tires and/or tracks of the vehicle 100. The wheels, tires and/or tracks can be made of any suitable material.

The vehicle 100 can include a braking system 155. The braking system 155 can include one or more mechanisms, devices, elements, components, systems, and/or combinations thereof, now known or later developed, configured to decelerate the vehicle 100. As an example, the braking system 155 can use friction to slow the wheels/tires. The braking system 155 can convert the kinetic energy of the wheels/tires to electric current.

Further, the vehicle 100 can include a steering system 160. The steering system 160 can include one or more mechanisms, devices, elements, components, systems, and/ or combinations thereof, now known or later developed, configured to adjust the heading of the vehicle 100.

The vehicle 100 can include a throttle system 165. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The vehicle 100 can include a transmission system 170. The transmission system 170 can include one or more mechanisms, devices, elements, components, systems, and/ or combinations thereof, now known or later developed, configured to transmit mechanical power from the engine/ motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 175. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100. For instance, the signaling system 175 can provide information regarding the vehicle's presence, position, size, direction of travel, and/or the driver's intentions regarding direction and speed of travel. For instance, the signaling system 175 can include headlights, taillights, brake lights, hazard lights and turn signal lights.

The vehicle 100 can include a navigation system 180. The navigation system 180 can include one or more mechanisms, devices, elements, components, systems, applications and/or combinations thereof, now known or later developed, configured to determine the geographic location of the vehicle 100 and/or to determine a travel route for the vehicle 100.

The navigation system 180 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 180 can be configured to update the travel route dynamically while the vehicle 100 is in operation.

The navigation system 180 can include a global positioning system, a local positioning system or a geolocation system. The navigation system 180 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 180 can use Transmission Control Protocol (TCP) and/or a Geographic information system (GIS) and location services.

The navigation system 180 may include a transceiver configured to estimate a position of the vehicle 100 with respect to the Earth. For example, navigation system 180 can include a GPS transceiver to determine the vehicle's latitude, longitude and/or altitude. The navigation system 180 can use other systems (e.g. laser-based localization systems, inertial-aided GPS, and/or camera-based localization) to determine the location of the vehicle 100.

Alternatively or in addition, the navigation system 180 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the autonomous driving module 120 can be operatively connected to communicate with the various vehicle systems 145 and/or individual components thereof. For example, returning to FIG. 1, the processor 110 and/or the autonomous driving module 120 can be in communication to send and/or receive information from the various vehicle systems 145 to control the movement, speed, maneuvering, heading, direction, etc. of vehicle 100. The processor 110 and/or the autonomous driving module 120 may control some or all of these vehicle systems 145 and, thus, may be partially or fully autonomous.

The processor 110 and/or the autonomous driving module 120 may be operable to control the navigation and/or maneuvering of the vehicle 100 by controlling one or more of the vehicle systems 145 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 145 or components thereof to responsive to receiving signals or other inputs from the processor 110 and/or the autonomous driving module 120. Any suitable actuator can be used. For instance, the one or more actuators 140 can include motors, pneumatic actuators, hydraulic pistons, relays, solenoids, and/or piezoelectric actuators, just to name a few possibilities.

According to arrangements described herein, the vehicle 100 can be configured for operating an autonomous vehicle in occupant view-obstructed environments. According to arrangements herein, the vehicle 100 (or one or more elements thereof) can be configured to determine an occupant viewable area of the external environment, a sensor detection area of the sensor system 125 and/or the camera system 127, and/or identify an information critical area along a current travel route of the vehicle 100 that is related to a future driving action.

In one or more arrangements, an action can be taken in response to determining that one or more detected objects in the external environment is located outside of a determined occupant viewable area. For instance, the action can be presenting an alert within the vehicle 100. Alternatively or in addition, the action can be causing a current driving action of the vehicle 100 to be modified. These and other examples of possible actions will be described in greater detail throughout this description. In one or more arrangements, the processor 110, the autonomous driving module 120, the viewing analysis module 121 and/or other element(s) can be configured to determine whether one or more detected objects in the external environment is located outside of a determined occupant viewable area.

In one or more arrangements, an action can be taken in response to determining that at least a portion of an information critical area is located outside of the determined occupant viewable area. For instance, the action can be causing a current driving action of the vehicle 100 to be modified. These and other examples of possible actions will be described in greater detail throughout this description. In one or more arrangements, the processor 110, the autonomous driving module 120, the viewing analysis module 121, the information critical area determination module 122 and/or other element(s) can be configured to determine whether at least a portion of an information critical area is located outside of the determined occupant viewable area.

Figure 2:
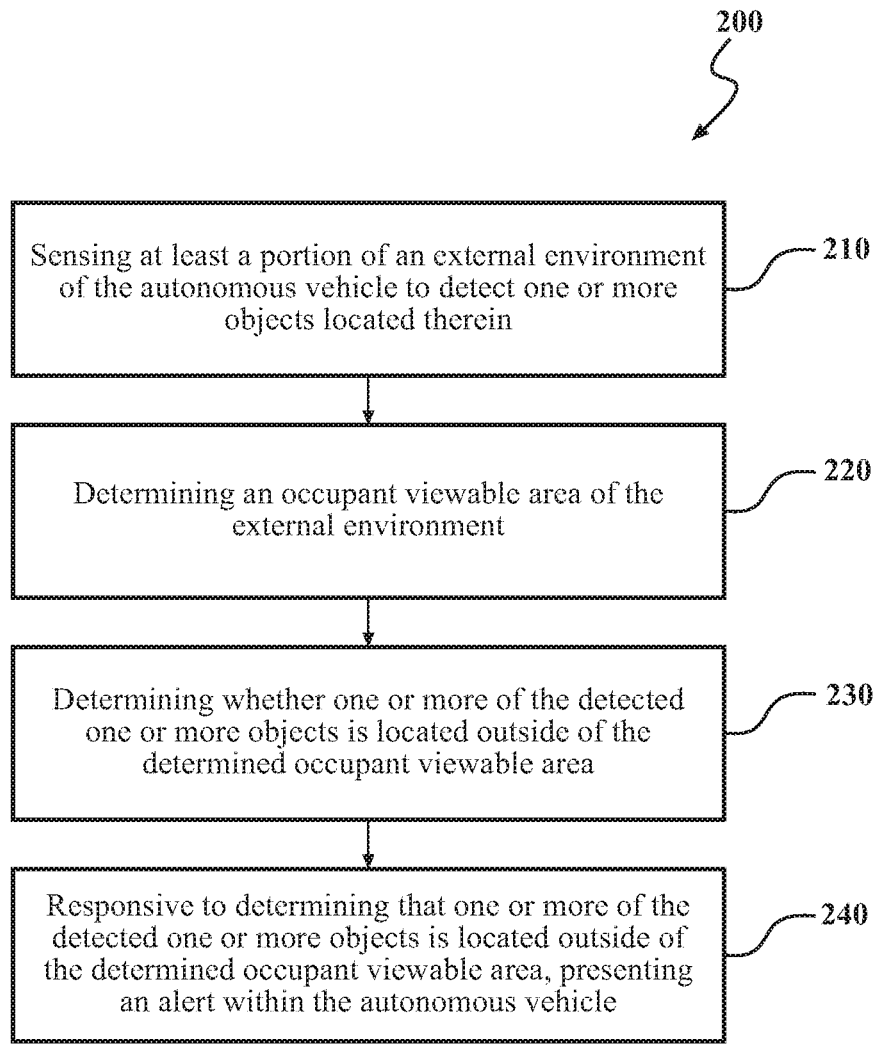
FIG. 2 is an example of a method of operating an autonomous vehicle in a view-obstructed environment.

Now that the various potential systems, devices, elements and/or components of the vehicle 100 have been described, various methods for operating an autonomous vehicle in a view-obstructed environment will now be described. Referring now to FIG. 2, an example of a method of operating an autonomous vehicle in view-obstructed environment is shown. Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, at least a portion of an external environment of the autonomous vehicle can be sensed to detect one or more objects located therein. In one or more arrangements, the detecting of the external environment can be performed by one or more sensors of the sensor system 125 (e.g. one or more of the environment sensors 126) and/or by the camera system 127 (e.g. one or more of the cameras 128). In some arrangements, the detecting of the external environment can be performed continuously or at any suitable interval.

If an object is detected in the external environment, the method 200 can continue to block 220. If no objects are detected in the external environment, the method 200 can return to block 210, or the method 200 can end.

At block 220, an occupant viewable area of the external environment can be determined. The determining of the occupant viewable area can be performed by any suitable element or combination of elements of the vehicle 100. In one or more arrangements, the determining of the occupant viewable area can be performed by the sensor system 125, the camera system 127, the viewing analysis module 121 and/or the processor 110. The determining of the occupant viewable area can be performed continuously or at any suitable interval. The method 200 can continue to block 230.

The one or more detected objects can be located relative to the determined occupant viewable area. In particular, at block 230, it can be determined whether one or more of the detected one or more objects is located outside of the determined occupant viewable area. The determining can be performed by any suitable element or combination of elements of the vehicle 100. For instance, in one or more arrangements, the determining can be performed by the processor 110, the sensor system 125, the camera system 127 and/or the viewing analysis module 121. The determining of whether one or more of the detected one or more objects is located outside of the determined occupant viewable area can be performed continuously or at any suitable interval. The determination of whether one or more of the detected one or more objects is located outside of the determined occupant viewable area can include comparing the location of the detected one or more objects to the location of the determined occupant viewable area. The method can continue to block 240.

At block 240, responsive to determining that one or more of the detected one or more objects is located outside of the determined occupant viewable area, an alert can be presented within the autonomous vehicle. The alert can be any type of alert, including, for example, a visual alert 132 and/or an audial alert 135. The alert can apprise one or more of the vehicle occupants that the vehicle (e.g. the sensor system 125 and/or the camera system 127) detects an object that cannot be perceived by one or more of the vehicle occupants.

When the alert is presented, the method 200 can end. Alternatively, the method 200 can return to block 210 or other block of the method 200. In one or more arrangements, the method 200 can include additional blocks (not shown). It should be noted that, in one or more arrangements, responsive to determining that the detected one or more objects is located within the determined occupant viewable area, then no action is taken (e.g. no alert is presented). Alternatively or in addition, responsive to determining that none of the detected one or more objects are located outside of the determined occupant viewable area, then no action is taken (e.g. no alert is presented).

A non-limiting example of the operation of the vehicle in accordance with the method 200 will now be described in relation to FIG. 4. For purposes of this example, the vehicle 100 can be traveling in an environment 400 on a road 405. As used herein, "road" means a thoroughfare, route, path or way between two places and upon which a vehicle can travel. The road 405 may be paved or otherwise improved to facilitate travel by a vehicle thereon. In some instances, the road 405 may be unpaved or undeveloped. The road 405 may be a public road or a private road. The road 405 can include or be a part of one or more bridges, tunnels, supporting structures, junctions, crossings, interchanges, and toll roads.

The road 405 can include a plurality of travel lanes 407, 410, 412, 415. As used herein, a "travel lane" is a portion of a road that is designated for use by a single line of vehicles and/or a portion of a road that is being used by a single line of vehicles. In some instances, the one or more travel lanes 407, 410, 412, 415 can be designated by markings on the road 405 or in any other suitable manner. In some instances, the one or more travel lanes 407, 410, 412, 415 may not be marked.

Figure 4:
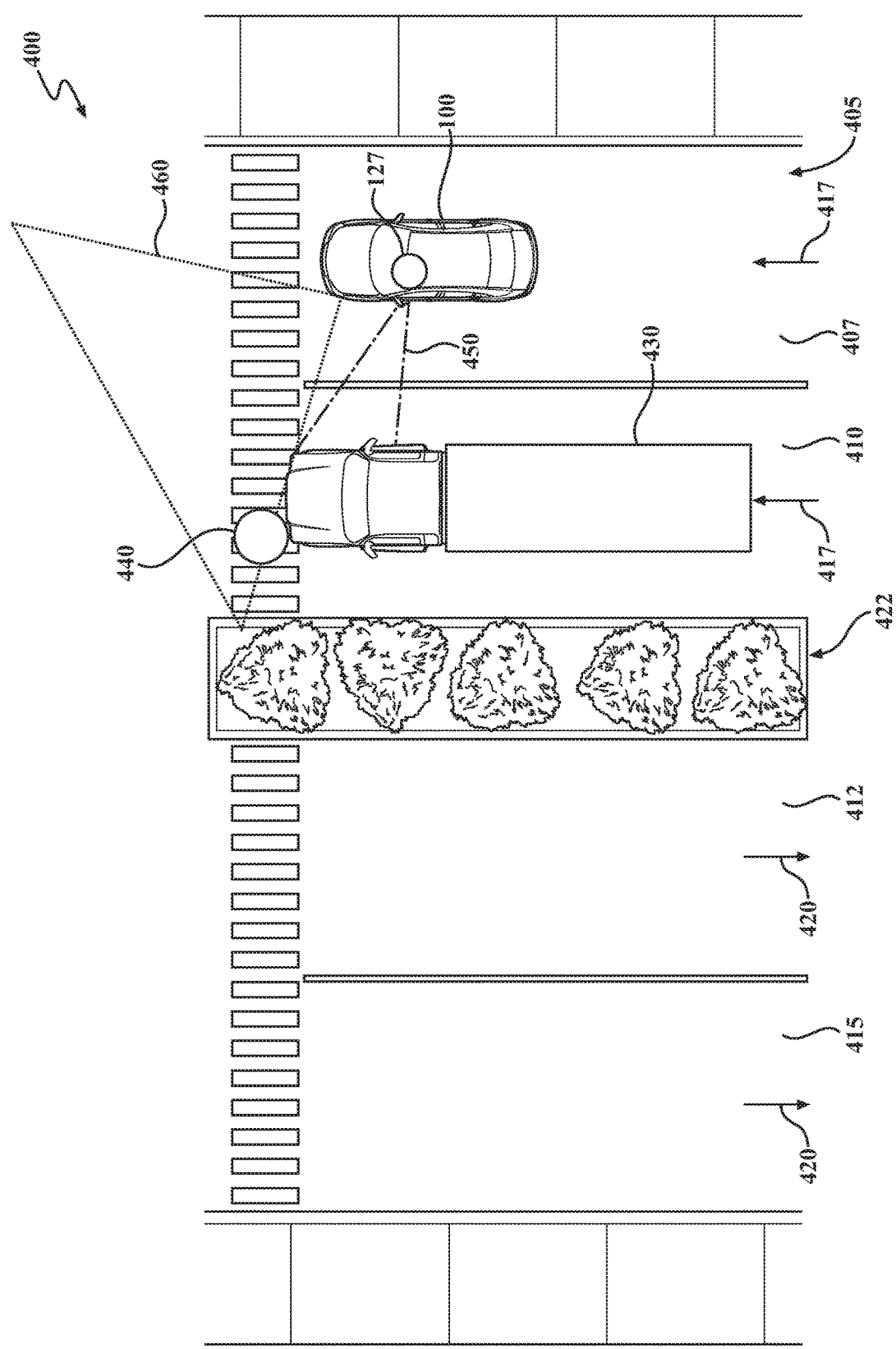
FIG. 4 is an example of an environment in which a detected object is located outside of a determined occupant viewable area of an autonomous vehicle.

In the arrangement shown in FIG. 4, the road 405 can be designated for two way travel. For purposes of this example, vehicles can move in a first direction 417 in a first travel lane 407 and a second travel lane 410, and vehicles can move in a second direction 420 in a third travel lane 412 and a fourth travel lane 415. The first direction 417 can be different than the second direction 420. For instance, the first direction 417 can be substantially opposite to the second direction 420, as is shown in FIG. 4. The first and second travel lanes 407, 410 can be separated from the third and fourth travel lanes 412, 415 by a median 422. It will be understood that the specific arrangements shown in FIG. 4 are provided merely as an example and that arrangements described herein are not limited to this example.

In FIG. 4, the current travel lane of the vehicle 100 can be the first travel lane 407. "Current travel lane" means a travel lane that a vehicle is traveling on at the present time. Another vehicle (e.g. truck 430) can be located in the second travel lane 410. The vehicle 100 and the truck 430 can be stopped at an intersection.

The vehicle 100 can sense at least a portion of the environment 400, such as by using the sensor system 125 and/or the camera system 127. The vehicle 100 can have an associated detection area 460. The vehicle 100 can detect the presence of an object 440 (e.g. a pedestrian, bicyclist, animal, etc.) in the external environment 400 and, more particularly, within the detection area 460.

An occupant viewable area 450 of the external environment 400 can be determined. The determining of the occupant viewable area 450 can be performed by, for example, the camera system 127, the viewing analysis module 121 and/or the processor 110. In this example, a portion of the occupant viewable area 450 can be obstructed by the presence of the truck 430. As a result, the occupant viewable area 450 may not be as large as it would otherwise be if the truck 430 were not present. The determining of the occupant viewable area 450 can be performed continuously or at any suitable interval. The occupant viewable area 450 can change based on changes in the external environment 400 (e.g. the truck 430 moves, another vehicle comes along, etc.).

It should be noted that the occupant viewable area 450 shown in FIG. 4 is determined for the driver of the vehicle 100. However, arrangements are not limited to the driver viewable area. Indeed, as an alternative or in addition, the occupant viewable area may include one or more passenger viewable areas.

The location of the detected object 440 relative to the occupant viewable area 450 can be determined. More particularly, it can be determined whether the detected object 440 is located outside of the determined occupant viewable area 450. The determining can be performed by, for example, the processor 110 and/or the viewing analysis module 121. In this example, it can be determined that the detected object 440 is located outside of the determined occupant viewable area 450.

In response to such a determination, an alert can be presented within the vehicle 100. The alert can be any type of alert, including, for example, a visual alert 132 and/or an audial alert 135. For purposes of this example, an audial alert 135 can be presented. The audial alert 135 can provide any suitable information. For instance, the audial alert 135 may indicate that an object is detected outside of the occupant viewable area. The audial alert 135 may also indicate the location of the detected object relative to the vehicle 100, the nature of the detected object (e.g. vehicle, pedestrian, etc.), the current speed of the detected object and/or the current direction in which the detected object is moving, just to name a few possibilities.

In one or more arrangements, the audial alert 135 can be emitted in a location within the vehicle 100 generally corresponding to the location of the detected object 440 relative to the vehicle 100. Thus, for example, in the arrangement shown in FIG. 4, the object 440 is located on a left side of the vehicle 100. Accordingly, the audial alert 135 can be emitted within the vehicle 100 on a left side portion thereof, such as from one or more speakers 136 located on the left side of the vehicle 100.

When the alert is presented, one or more vehicle occupants can be made aware of the presence of an object in a portion of the environment 400 that is detected by the vehicle 100 but that the one or more vehicle occupants cannot see. With such awareness, the one or more vehicle occupants can gain confidence in the autonomous operational mode of the vehicle 100. Also, the driver may decide to operate the vehicle 100 at least partially in the manual mode or may continue to allow the vehicle 100 to continue in the autonomous operational mode.

Figure 5:
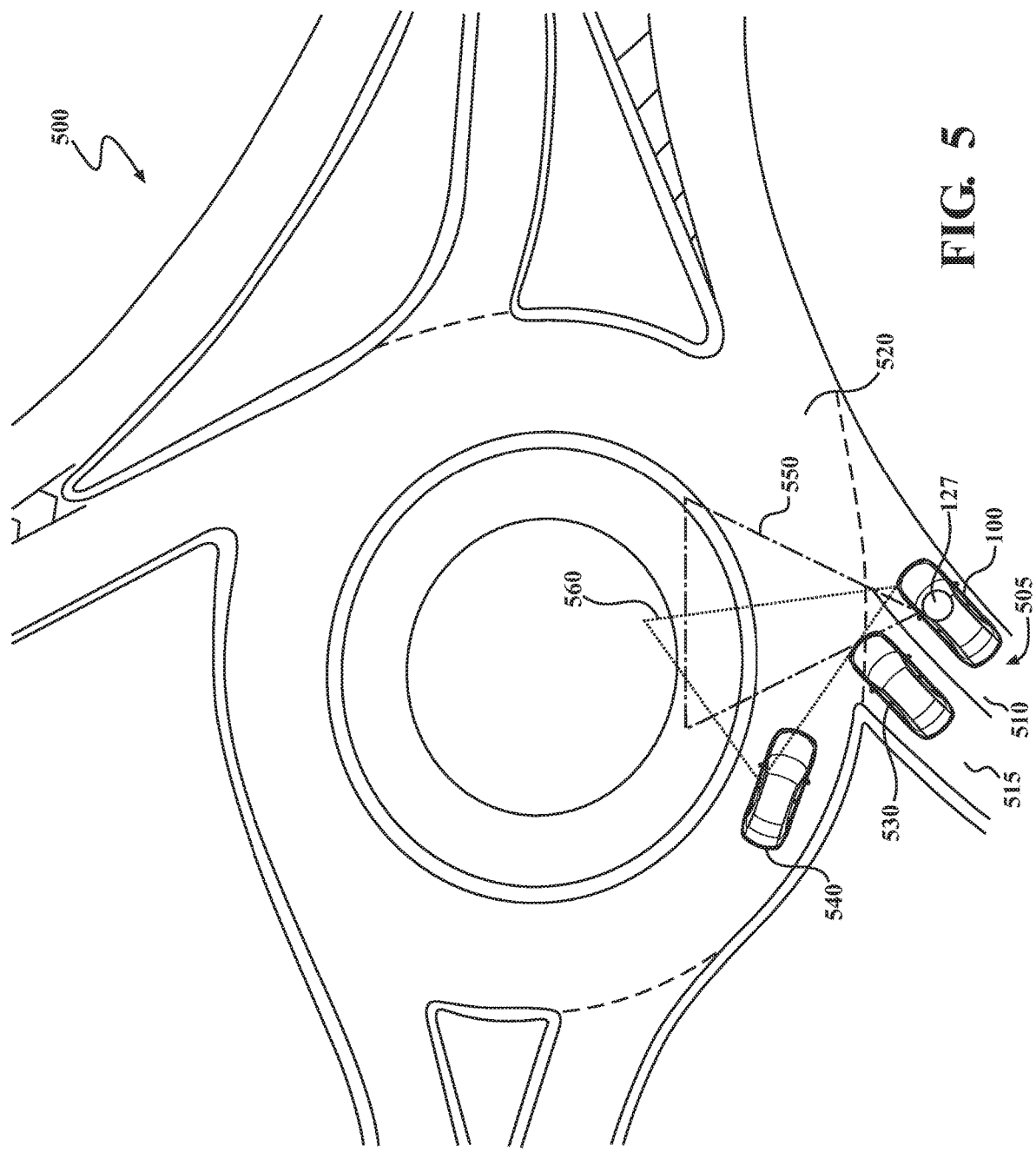
FIG. 5 is an example of an environment in which a detected object is located outside of a determined occupant viewable area of an autonomous vehicle.

Another non-limiting example of the operation of the vehicle in accordance with the method 300 will now be described in relation to FIG. 5. For purposes of this example, the vehicle 100 can be located in an environment 500. The vehicle 100 can be traveling on a road 505. The above discussion of the road 405 in FIG. 4 is applicable to the road 505. The road 505 can include a plurality of travel lanes, including a first travel lane 510 and a second travel lane 515.

The current travel lane of the vehicle 100 can be the first travel lane 510. An object (e.g. second vehicle 530) can be located in the second travel lane 515. The vehicle 100 and the second vehicle 530 can be stopped and awaiting to enter a roundabout 520. There can be a third vehicle 540 in the environment 500. The third vehicle 540 can be traveling on the roundabout 520.

The vehicle 100 can sense at least a portion of the environment 500, such as by using the sensor system 125 and/or the camera system 127. Accordingly, the vehicle 100 can have an associated detection area 560. The vehicle 100 can detect the presence of an object (e.g. the third vehicle 540), as at least a portion of the third vehicle 540 is located within the detection area 560.

An occupant viewable area 550 of the external environment 500 can be determined. The determining of the occupant viewable area 550 can be performed by, for example, the sensor system 125, the camera system 127, the viewing analysis module 121 and/or the processor 110. In this example, the occupant viewable area 550 can be partially obstructed by the presence of the second vehicle 530. As a result, the occupant viewable area 550 may not be as large as it would otherwise be if the second vehicle 530 was not present.

The location of the third vehicle 540 relative to the occupant viewable area 550 can be determined. More particularly, it can be determined whether the third vehicle 540 is located outside of the determined occupant viewable area 550. The determining can be performed by, for example, the processor 110 and/or the viewing analysis module 121. In this example, it is determined that the third vehicle 540 is located outside of the determined occupant viewable area 550.

In response to such a determination, an alert can be presented within the vehicle 100. The alert can be any type of alert, including, for example, a visual alert 132 and/or an audial alert 135. For purposes of this example, a visual alert 132 can be presented. The visual alert 132 can be presented by one or more components of the output system 131, such as one or more displays 133 and/or one or more light sources 134.

The visual alert 132 can have any suitable form. In one or more arrangements, the visual alert 132 provide any suitable information. For instance, the visual alert 132 may indicate that an object is detected outside of the occupant viewable area. The visual alert 132 may also indicate the location of the detected object relative to the vehicle 100, the nature of the detected object (e.g. vehicle, pedestrian, etc.), the current speed of the detected object and/or the current direction in which the detected object is moving, just to name a few possibilities.

Figure 7:
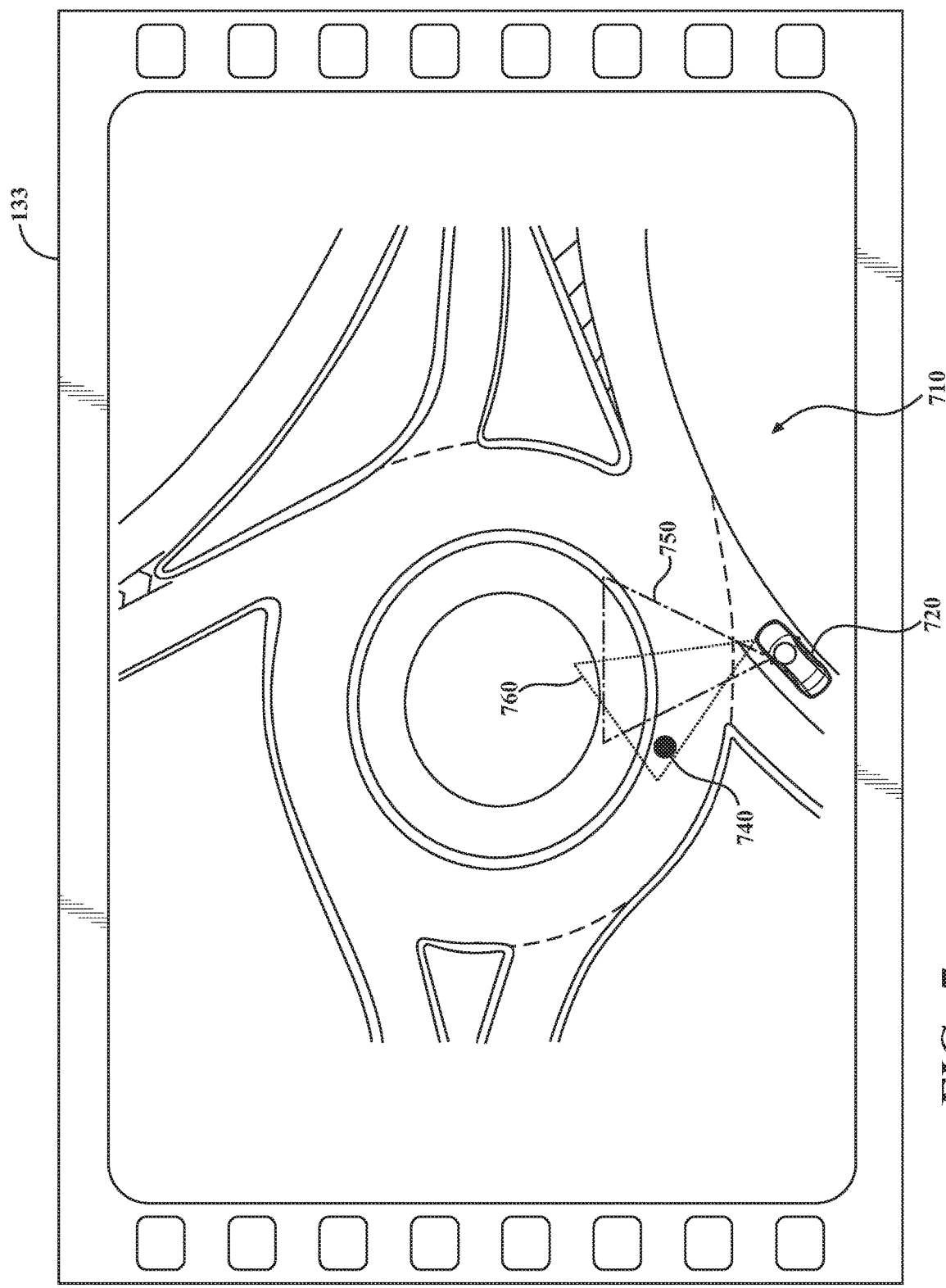
FIG. 7 is an example of a display located within an autonomous vehicle, wherein a visual alert is presented on the display.

FIG. 7 shows an example in which the visual alert 132 is presented on a display 133. To facilitate the description, the visual alert 132 presented on the display 133 generally corresponds to the scenario presented in FIG. 5 for this example. In one or more arrangements, the visual alert 132 can include a representation of the external environment 710. The representation of the external environment 710 can present graphical, photographic, video, satellite and/or map information or data, which can be obtained from any suitable source, including, for example, from the data store 115, the navigation system 180 and other suitable source to which one or more elements of the vehicle 100 are operatively connected. Such a source may be located external to the vehicle 100.

The visual alert 132 can include a representation of the detected object(s) 740 in the external environment. More particularly, the visual alert 132 can include a representation of the detected object(s) 740 that are located outside of the occupant viewable area. In one or more arrangements, the visual alert 132 can include a representation of the detected objects that are located within the occupant viewable area. Alternatively, in one or more arrangements, the visual alert 132 may not include a representation of the detected objects that are located within the occupant viewable area. As an example, in FIG. 7, a representation of the second vehicle 530 is not included. The representation of the detected object(s) 740 can be overlaid upon the representation of the external environment 710, as is shown in FIG. 7. The representation of the detected object(s) 740 can be substantially accurately positioned relative to the representation of the external environment 710.

The visual alert 132 can include a representation of the occupant viewable area 750 and/or a representation of the detection area 760. The representation of the occupant viewable area 750 and/or the representation of the detection area 760 can be overlaid upon the representation of the external environment 710. In some instances, the representation of the occupant viewable area 750 and/or the representation of the detection area 760 can be visually distinguishable from each other in one or more respects, including, for example, different colors, shading or borders.

Alternatively or in addition to the above, the visual alert 132 can include one or more light sources 134. In such case, one or more of the light sources can be activated to emit light energy to alert an occupant of the vehicle 100 that an object is detected in the external environment that is not within the determined occupant viewable area.

In one or more arrangements, the light sources can be activated in a location within the vehicle 100 that generally corresponds to the location of the detected one or more objects located outside of the determined occupant viewable area. Thus, for example, in the arrangement shown in FIG. 5, the object (e.g. third vehicle 540) is located on the left side of the vehicle 100. Accordingly, one or more light sources on the left side of the vehicle 100 can be activated.

Figure 3:
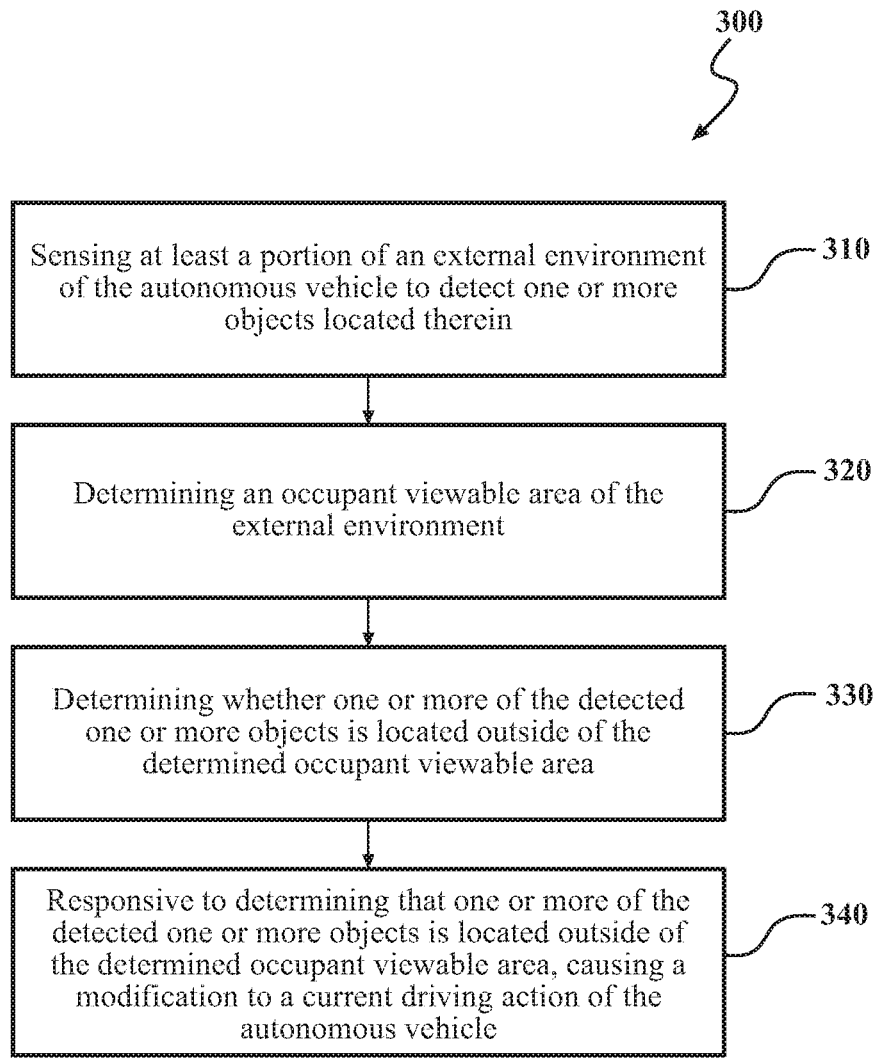
FIG. 3 is an example of a method of operating an autonomous vehicle in a view-obstructed environment.

Another example of a method of operating an autonomous vehicle in view-obstructed portions of an external environment will now be described. Referring now to FIG. 3, an example of a method of operating an autonomous vehicle in view-obstructed portions of an external environment is shown. Various possible steps of method 300 will now be described. The method 300 illustrated in FIG. 3 may be applicable to the embodiments described above in relation to FIG. 1, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

Block 310, block 320 and block 330 in FIG. 3 are similar to block 210, block 220 and block 230 in FIG. 2, respectively. Accordingly, the above discussion made with respect to blocks 210, 220 and 230 is equally applicable to blocks 310, 320, 330, respectively. The method can continue to block 340.

At block 340, responsive to determining that one or more of the detected one or more objects is located outside of the determined occupant viewable area, the vehicle 100 can be caused to modify a current driving action of the vehicle 100. In one or more arrangements, the processor 110 and/or the autonomous driving module 120 can cause the vehicle 100 to modify the current driving action. The processor 110 and/or the autonomous driving module 120 can be operatively connected to one or more of the vehicle systems 145 to cause the modification to the current driving action of the vehicle 100. In one or more arrangements, the processor 110 and/or the autonomous driving module 120 can be operable to control the one or more actuators 140, which can control one or more of the vehicle systems 145 or portions thereof to cause the modification to the current driving action of the vehicle 100.

Any suitable modification to the current driving action of the vehicle 100 can be caused. In one or more arrangements, the modification to the current driving action can include reducing the speed of the vehicle 100. Alternatively or in addition, the modification to the current driving action can include moving the vehicle 100 in a conservative manner.

When the current driving action is modified, the method 300 can end. Alternatively, the method 300 can return to block 310. As a further alternative, the method 300 can include additional blocks (not shown). For instance, once the vehicle 100 has moved to a point in which the detected one or more objects are located within the occupant viewable area, the modification to the current driving action can be discontinued. It should be noted that, in one or more arrangements, responsive to determining that the detected one or more objects is located within the determined occupant viewable area, then no action is taken (e.g. the current driving action is not modified). Alternatively or in addition, responsive to determining that none of the detected one or more objects are located outside of the determined occupant viewable area, then no action is taken (e.g. the current driving action is not modified).

A non-limiting example of the operation of the vehicle in accordance with the method 300 will now be described in relation to FIG. 6. For purposes of this example, the vehicle 100 can be traveling in an environment 600 on a road 605. The above discussion of the road 405 in FIG. 4 is applicable to the road 605. The road 605 can include a plurality of travel lanes, including a first travel lane 610, a second travel lane 615 and a third travel lane 620.

Figure 6:
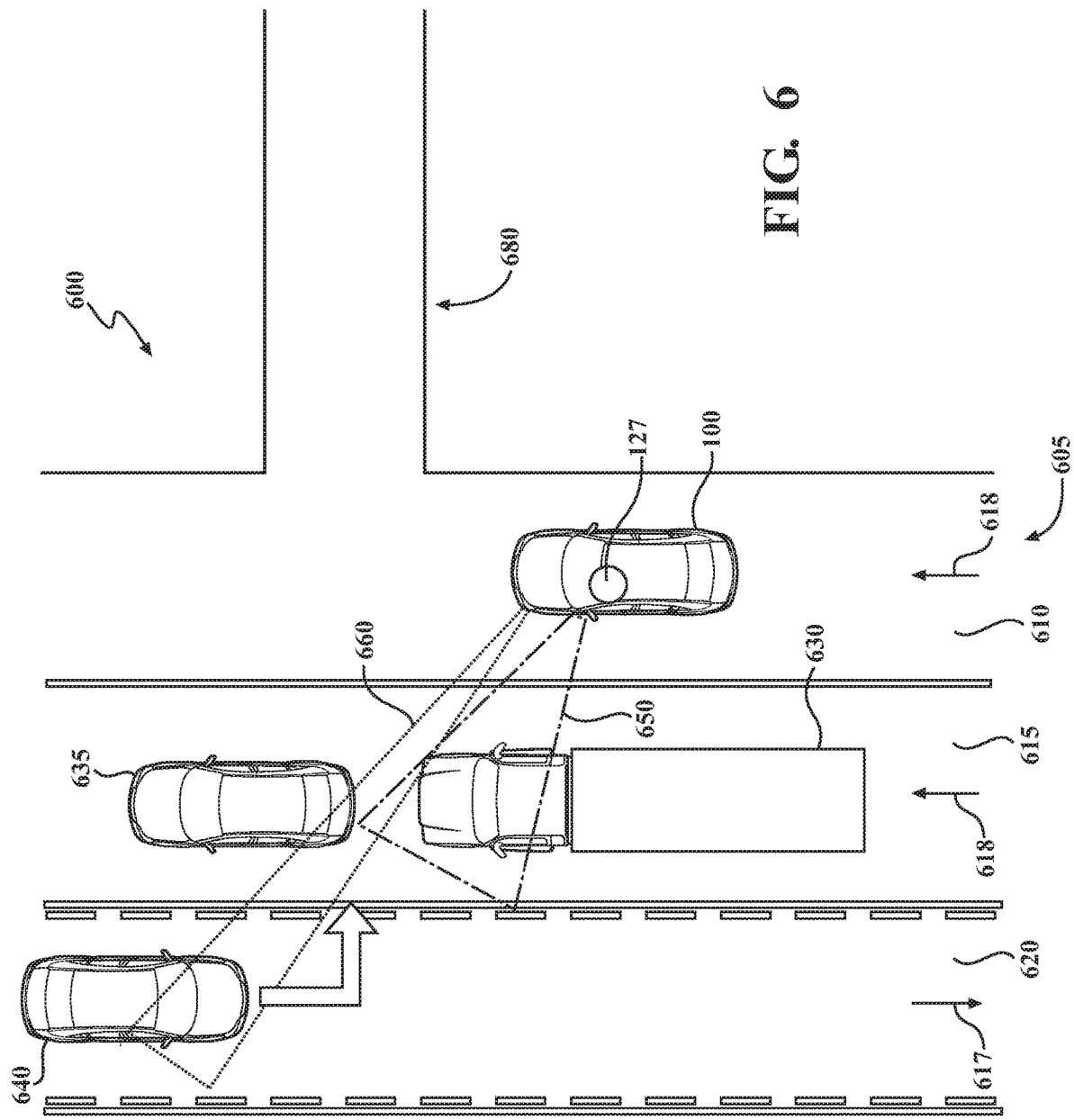
FIG. 6 is an example of an environment in which a detected object is located outside of a determined occupant viewable area of an autonomous vehicle.

In the arrangement shown in FIG. 6, the road 605 can be designated for two way travel. For purposes of this example, vehicles can move in a first travel direction 618 in the first travel lane 610 and the second travel lane 615, and vehicles can move in a second travel direction 617 in the third travel lane 620. The first travel direction 618 is different from the second travel direction 617. In one or more arrangements, the first travel direction 618 can be substantially opposite to the second travel direction 617, as is shown in FIG. 6. It will be understood that the specific arrangements shown in FIG. 6 are provided merely as an example and that arrangements described herein are not limited to this example.

In FIG. 6, the current travel lane of the vehicle 100 can be the first travel lane 610. One or more objects (e.g. a truck 630 and a forward vehicle 635) can be located in the second travel lane 615. An object (e.g. a turning vehicle 640) can be located in the third travel lane 620. The turning vehicle 640 can be awaiting an opportunity to turn left onto a transverse road 680. The transverse road 680 and the road 605 can have any suitable orientation with respect to each other. For instance, the transverse road 680 and the road 605 can be oriented at about 90 degrees relative to each other, as is shown in FIG. 6.

The vehicle 100 can sense at least a portion of the environment 600, such as by using the sensor system 125 and/or the camera system 127. The vehicle 100 can have an associated detection area 660. The vehicle 100 can detect the presence of an object (e.g. the turning vehicle 640), as the turning vehicle 640 is located within the detection area 660.

An occupant viewable area 650 of the external environment 600 can be determined. The determining of the occupant viewable area 650 can be performed by, for example, the sensor system 125, the camera system 127, the viewing analysis module 121 and/or the processor 110. In this example, the occupant viewable area 650 can be partially obstructed by the presence of the truck 630 and/or the forward vehicle 635. As a result, the occupant viewable area 650 may not be as large as it would otherwise be in the absence of such obstructing objects.

The location of the turning vehicle 640 relative to the occupant viewable area 650 can be determined. More particularly, it can be determined whether the turning vehicle 640 is located outside of the determined occupant viewable area 650. The determining can be performed by the processor 110 and/or the viewing analysis module 121. In this example, it is determined that the turning vehicle 640 is located outside of the determined occupant viewable area 650.

In response to such a determination, the vehicle 100 can be caused to modify a current driving action. For instance, the current speed of the vehicle 100 can be reduced. The vehicle can be traveling at a current speed. The speed of the vehicle 100 can be reduced by a predetermined amount relative to the current speed or to the posted speed limit, by a predetermined percentage relative to the current speed or to the posted speed limit, or to a fixed predetermined speed. In one or more arrangements, the predetermined percentage can be at least about 10%, at least about 15%, at least about 20%, at least about 25%, at least about 30%, at least about 35%, at least about 40%, at least about 45%, or at least about 50% of the current speed of the vehicle or to the posted speed limit. The vehicle 100 can continue to operate at the reduced speed at least until the turning vehicle 640 is determined to be located within the detected occupant viewable area 650.

Figure 8:
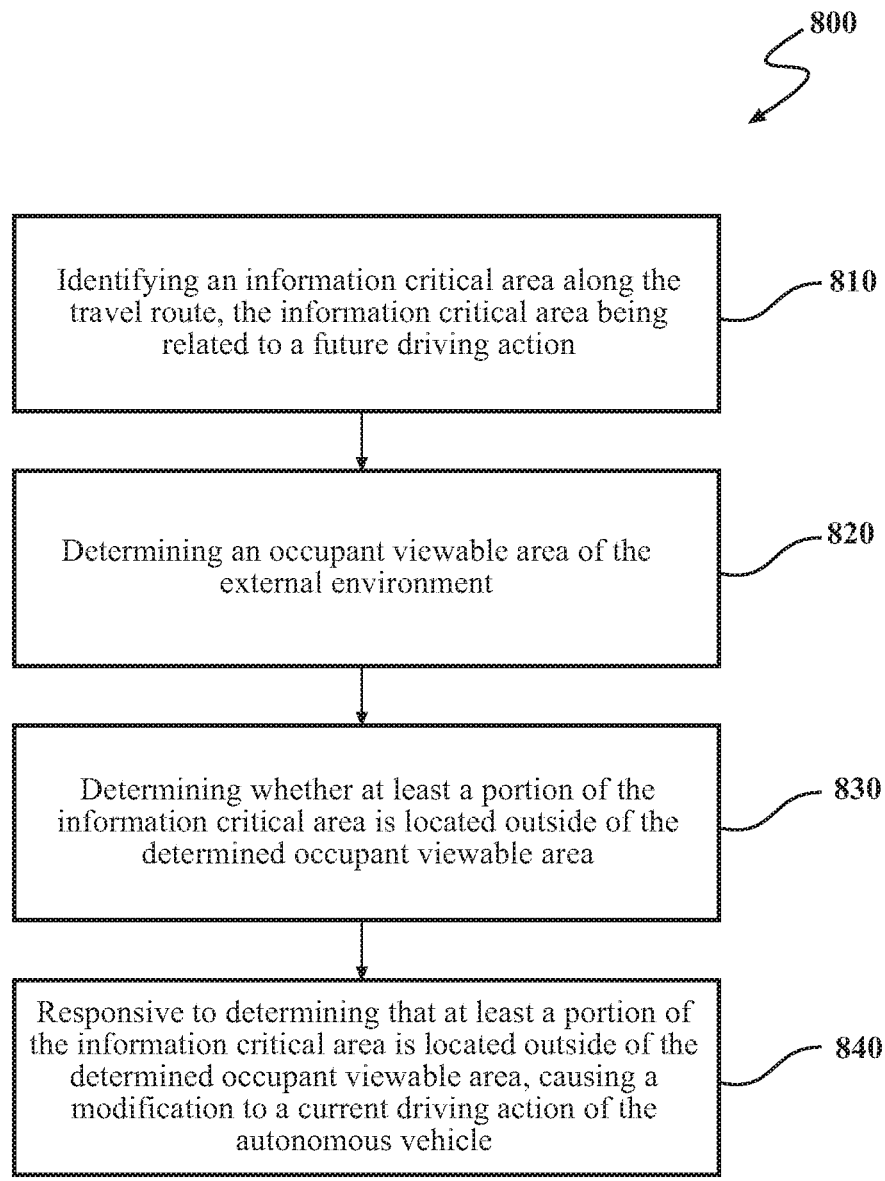
FIG. 8 is an example of a method of operating an autonomous vehicle in a view-obstructed environment.

Referring now to FIG. 8, an example of another method of operating an autonomous vehicle in view-obstructed portions of a travel route is shown. Various possible steps of method 800 will now be described. The method 800 illustrated in FIG. 8 may be applicable to the embodiments described above in relation to FIG. 1, but it is understood that the method 800 can be carried out with other suitable systems and arrangements. Moreover, the method 800 may include other steps that are not shown here, and in fact, the method 800 is not limited to including every step shown in FIG. 8. The steps that are illustrated here as part of the method 800 are not limited to this particular chronological order. Indeed, some of the steps may be performed in a different order than what is shown and/or at least some of the steps shown can occur simultaneously.

At block 810, an information critical area along at least a portion of the travel route can be identified. The information critical area can be related to a future driving action of the vehicle 100. In one or more arrangements, the identifying of the information critical area can be performed by the information critical area determination module 122, the navigation system 180 and/or the processor 110. In some arrangements, the identifying of the information critical area can be performed continuously or at any suitable interval. The method 800 can continue to block 820.

At block 820, an occupant viewable area of the external environment can be determined. The determining of the occupant viewable area can be performed by any suitable element or combination of elements of the vehicle 100. In one or more arrangements, the determining of the occupant viewable area can be performed by the sensor system 125, the camera system 127 (e.g. one or more occupant view cameras), the viewing analysis module 121 and/or the processor 110. The determining of the occupant viewable area can be performed continuously or at any suitable interval. The method 800 can continue to block 830.

At block 830, it can be determined whether at least a portion of the information critical area is located outside of the determined occupant viewable area. The determining can be performed by any suitable element or combination of elements of the vehicle 100. For instance, in one or more arrangements, the determining can be performed by the processor 110, the viewing analysis module 121 and/or the information critical area determination module 122. The determining of the occupant viewable area can be performed continuously or at any suitable interval. The method can continue to block 840.

At block 840, responsive to determining that at least a portion of the information critical area is located outside of the determined occupant viewable area, a current driving action of the vehicle 100 can be caused to be modified. Any suitable modification to a current driving action of the vehicle 100 can be performed. For instance, the current driving action can be traveling forward at a current speed. In such case, the current driving action can be modified by reducing the speed of the vehicle. It should be noted that the modification to the current driving action of the vehicle 100 can be implemented automatically. Further, the modification to the current driving action of the vehicle 100 can be implemented regardless of whether the vehicle 100 (e.g. the sensor system 125 and/or the camera system 127) is able to sense the entire information critical area.

In one or more arrangements, the processor 110 and/or the autonomous driving module 120 can cause the vehicle 100 to modify the current driving action of the vehicle 100. The processor 110 and/or the autonomous driving module 120 can be operatively connected to one or more of the vehicle systems 145 to cause to modification to current driving action of the vehicle 100 to be implemented. In one or more arrangements, the processor 110 and/or the autonomous driving module 120 can be operable to control the one or more actuators 140, which can control one or more of the vehicle systems 145 or portions thereof to implement the modification to the current driving action.

When the modification to the current driving action is implemented, the method 800 can end. Alternatively, the method 800 can return to block 810. As a further alternative, the method 800 can include additional blocks (not shown). In some instances, once the vehicle 100 has moved to a predetermined point, the modification to the current driving action can be discontinued. The predetermined point can be a point at which the information critical area is determined to be located entirely within the occupant viewable area. Alternatively, the predetermined point can be a point at which a majority of the information critical area (e.g. at least about 51%, at least about 55%, at least about 60%, at least about 65%, at least about 70%, at least about 75%, at least about 80%, at least about 85%, at least about 90%, or at least about 95%) is determined to be located within the occupant viewable area.

The method 800 can be implemented in various scenarios. In one or more arrangements, the method 800 can be implemented in instances in which the driver is responsible for safe operation of the vehicle 100. If the vehicle 100 (e.g. the sensor system 125 and/or the camera system 127) does not detect any objects in an information critical area that is related to a future driving action and if the vehicle 100 (e.g. the sensor system 125 and/or the autonomous driving module 120) determines that it is safe to proceed with the future driving action, the driver of the vehicle 100 may not want and/or should not rely on that determination in at least some instances. For instance there could be a failure of at least a portion of the sensor system 125 and/or at least a portion of the camera system 127. In with respect to such information critical areas, the driver should visually confirm the safety of the situation instead of relying on the vehicle 100. Thus, if it is determined that the driver cannot see at least a portion of the information critical area that is related to a future driving action, then the current speed of the vehicle 100 may be reduced or some other modification to the current driving action can be taken so that the driver or other vehicle occupant can visually or otherwise sense the information critical area.

Figure 9:
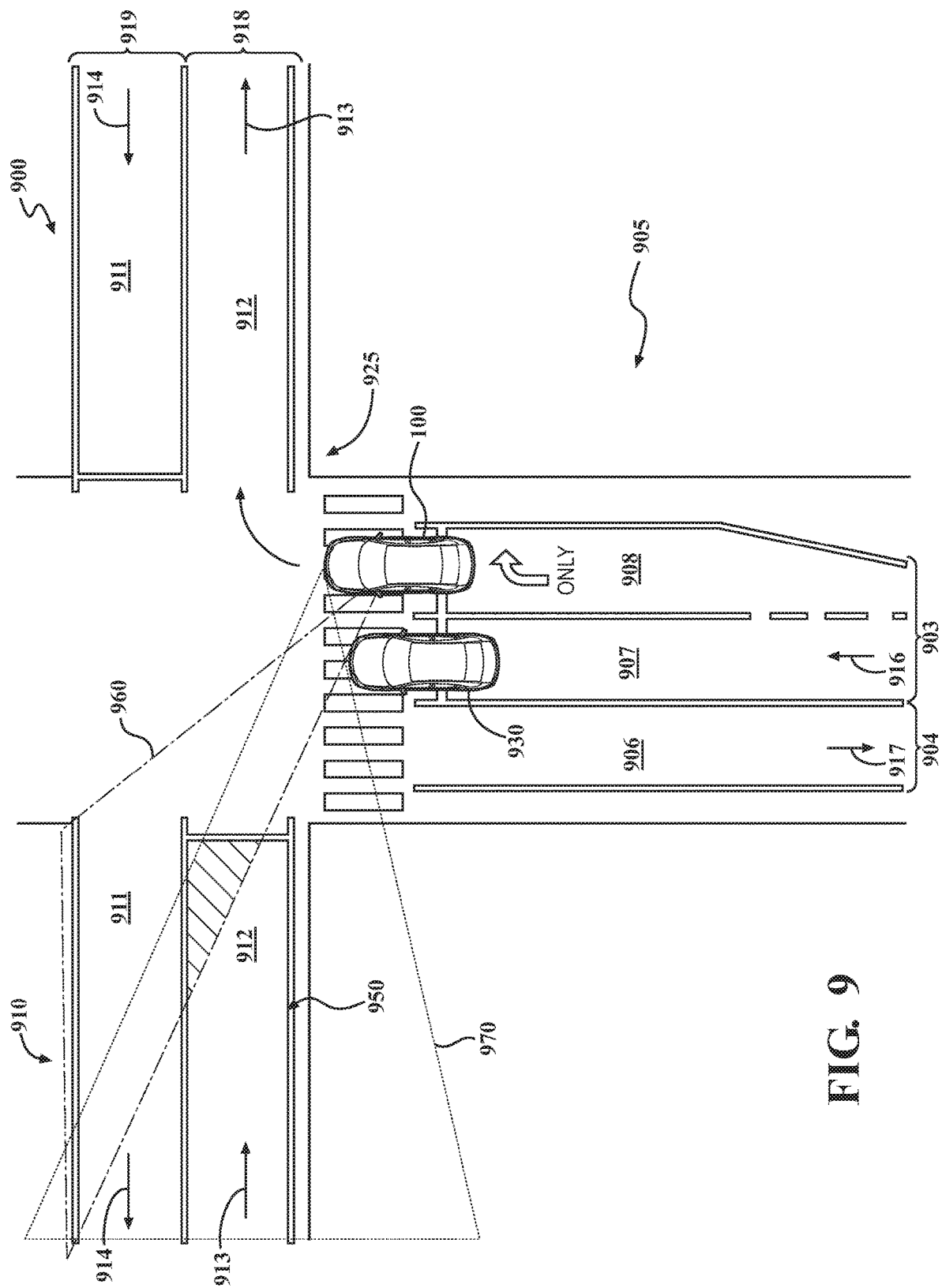
FIG. 9 is an example of an environment in which at least a portion of an information critical area is located outside of a determined viewable area of an occupant of the autonomous vehicle.

One non-limiting example of the operation of the vehicle 100 in accordance with the method 800 will now be described in relation to FIG. 9. For purposes of this example, the vehicle 100 can be traveling in an environment 900 that includes a first road 905 and a second road 910. The first road 905 and the second road 910 can cross each other to form an intersection 925. In one or more arrangements, traffic with respect to the intersection 925 can be regulated using any suitable traffic control device (e.g. stop signs, traffic lights, etc.). In one or more arrangements, the intersection 925 may not have an associated traffic control device. The first road 905 and the second road 910 can be oriented at any suitable angle with respect to each other. For instance, the first road 905 and the second road 910 can be oriented at substantially 90 degrees relative to each other, as is shown in FIG. 9. However, in one or more arrangements, the first road 905 and the second road 910 can be oriented at an acute angle with respect to each other. In one or more arrangements, the first road 905 and the second road 910 can be angled at an obtuse angle with respect to each other. Further, in some arrangements, the intersection 925 can be formed by more than two roads.

The first road 905 and the second road 910 can have any suitable configuration and/or layout. The first road 905 and/or the second road 910 can be designated for two way travel, including a plurality of travel lanes. For purposes of this example, the first road 905 can include a first set of one or more travel lanes 903 and a second set of one or more travel lanes 904. The first set of travel lanes 903 can be intended or designated for vehicular travel in a first direction 916. The second set of travel lanes 904 can be intended or designated for vehicular travel in a second direction 917. The first direction 916 can be different from the second direction 917. For example, the first direction 916 can be substantially opposite to the second direction 917.

The first set of travel lanes 903 and the second set of travel lanes 904 can include any suitable type and/or quantity of travel lanes. For instance, FIG. 9 shows an example in which, at least which respect to the portion of the first road 905 below the intersection 925, the first set of travel lanes 903 can include a travel lane 907 and a dedicated right turn lane 908. The second set of travel lanes 904 can include a single travel lane 906.

The second road 910 can include a third set of one or more travel lanes 918 and a fourth set of one or more travel lanes 919. The third set of travel lanes 918 can be intended or designated for vehicular travel in a third direction 913. The fourth set of travel lanes 919 can be intended or designated for vehicular travel in a fourth direction 914. The third direction 913 can be different from the fourth direction 914. For example, the third direction 913 can be substantially opposite to the fourth direction 914.

The third set of travel lanes 918 and the fourth set of travel lanes 919 can include any suitable type and/or quantity of travel lanes. For instance, FIG. 9 shows an example in which the third set of travel lanes 918 can include a travel lane 912, and the fourth set of travel lanes 919 can include a travel lane 911.

It will be understood that arrangements shown and described herein with respect to the first road 905, the second road 910 and/or the intersection 925 are provided merely as examples, and arrangements are not limited to the particular arrangements shown and described. Indeed, arrangements described herein can be used in connection with roads having any quantity, type and/or arrangement of travel lanes.

The vehicle 100 can be traveling on the first road 905. The current travel path of the vehicle 100 can include turning right onto the second road 910. The vehicle 100 can be approaching the intersection 925 while traveling in the first direction 916. As it approaches the intersection 925, the current travel lane of the vehicle 100 can be the dedicated right turn lane 908. There can be another vehicle 930 located in the travel lane 907. The vehicle 100 and the other vehicle 930 can be presented with an indication to stop before proceeding into the intersection 925, such as by a traffic control device.

An information critical area along at least a portion of the travel route can be identified by the vehicle 100 (e.g. the information critical area determination module 122, the navigation system 180 and/or the processor 110). The information critical area can be related to a future planned driving action of the vehicle 100. In this example, the future planned driving action can be turning right onto the second road 910. As a result, one information critical area can include an information critical area 950 of the travel lane 912 located to the left (in FIG. 9) of the intersection 925, since any vehicles traveling in this information critical area 950 would be of concern to the vehicle 100 as it turns onto the second road 910.

The vehicle 100 can determine an occupant viewable area 960 of the external environment 900. However, the occupant viewable area 960 can be affected due to the presence of the other vehicle 930. In such case, the occupant viewable area 960 may not be as large as it would otherwise be in the absence of the other vehicle 930.

The vehicle 100 (the viewing analysis module 121, the information critical area determination module 122 and/or the processor 110) can determine whether at least a portion of the information critical area 950 is located outside of the determined occupant viewable area 960. Responsive to determining that at least a portion of the information critical area is located outside of the determined occupant viewable area, a current driving action of the vehicle 100 can be caused to be modified. For instance, the modification to the current driving action of the vehicle 100 can include reducing a current speed of the vehicle 100. In such case, the current speed of the vehicle 100 can be reduced to a reduced speed. The reduced speed can be maintained at least until the detected occupant viewable area of the informational critical area includes the entire information critical area or at least a substantial majority of the information critical area.

In one or more arrangements, the processor 110 and/or the autonomous driving module 120 can cause the vehicle 100 to modify the current driving action. The processor 110 and/or the autonomous driving module 120 can be operatively connected to one or more of the vehicle systems 145 to implement the current driving action of the vehicle 100. In one or more arrangements, the processor 110 and/or the autonomous driving module 120 can be operable to control the one or more actuators 140, which can control one or more of the vehicle systems 145 or portions thereof to implement the current driving action.

It should be noted that, in one or more arrangements, a vehicle occupant (e.g. a driver and/or other passenger) can be prompted to provide permission to implement the future driving action. The vehicle occupant can be prompted in any suitable manner. For instance, a prompt can be presented on a display within the vehicle 100. Alternatively or in addition, the prompt can be audibly output to the driver or other passenger over one or more audial channels. Other forms of prompting can be used as an alternative or in addition to the above-described forms of prompting. Responsive to receiving an input corresponding to a vehicle occupant's approval to implement the future driving action, the vehicle 100 can be caused to implement the future driving action.

It will be appreciated that arrangements described herein can provide numerous benefits, including one or more of the benefits mentioned herein. For example, arrangements described herein can improve the performance of an autonomous vehicle when operating in view-obstructed environments. Arrangements described herein can provide a degree of comfort and confidence to vehicle occupants by informing them that the vehicle is aware of the presence of objects that may not be visible to one or more of the vehicle occupants. Arrangements described herein can also provide a degree of comfort and confidence to vehicle occupants and/or improve vehicle safety by modifying a current driving action of the autonomous vehicle. Further, arrangements described herein can also improve the safe operation of the vehicle by modifying a current driving action of the autonomous vehicle when information critical areas are located relative to future driving actions are located outside of the determined occupant viewable area.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of operating an autonomous vehicle in a view-obstructed environment while the autonomous vehicle is operating in an autonomous mode, the method comprising:
    while the autonomous vehicle is operating in the autonomous mode:
        sensing at least a portion of an external environment of the autonomous vehicle to detect one or more objects located therein;
        determining an occupant viewable area of the external environment;
        determining whether one or more of the detected one or more objects is located outside of the determined occupant viewable area; and
        responsive to determining that one or more of the detected one or more objects is located outside of the determined occupant viewable area, causing a modification to a current driving action of the autonomous vehicle,
        wherein, in the autonomous mode, the autonomous vehicle is configured to navigate and maneuver itself without receiving input from a human driver such that the autonomous vehicle is fully autonomous, whereby the autonomous vehicle is driverless.

2. The method of claim 1, wherein causing a modification to a current driving action of the autonomous vehicle includes causing a current speed of the autonomous vehicle to be reduced.

3. The method of claim 2, wherein the current speed of the autonomous vehicle is reduced to a reduced speed, and wherein the reduced speed is maintained at least until the one or more of the detected one or more objects located outside of the determined occupant viewable area is determined to be located within the occupant viewable area.

4. The method of claim 1, further including:
responsive to determining that one or more of the detected one or more objects is located outside of the determined occupant viewable area, presenting an alert within the autonomous vehicle.

5. A system for operating an autonomous vehicle in a view-obstructed environment while the autonomous vehicle is operating in an autonomous mode, the system comprising:
a sensor system configured to detect one or more objects located in at least a portion of an external environment of the autonomous vehicle;
a processor operatively connected to the sensor system, the processor being programmed to initiate executable operations comprising:
while the autonomous vehicle is operating in the autonomous mode:
determining an occupant viewable area of the external environment;
determining whether one or more of the detected one or more objects is located outside of the determined occupant viewable area; and
responsive to determining that one or more of the detected one or more objects is located outside of the determined occupant viewable area, causing a modification to a current driving action of the autonomous vehicle,
wherein, in the autonomous mode, the autonomous vehicle is configured to navigate and maneuver itself without receiving input from a human driver such that the autonomous vehicle is fully autonomous, whereby the autonomous vehicle is driverless.

6. The system of claim 5, wherein causing a modification to a current driving action of the autonomous vehicle includes causing a current speed of the autonomous vehicle to be reduced.

7. The system of claim 6, wherein the current speed of the autonomous vehicle is reduced to a reduced speed, and wherein the executable operations further include maintaining the reduced speed at least until the one or more of the detected one or more objects located outside of the determined occupant viewable area is determined to be located within the occupant viewable area.

8. The system of claim 5, wherein the executable operations further include:
responsive to determining that one or more of the detected one or more objects is located outside of the determined occupant viewable area, presenting an alert within the autonomous vehicle.

9. A method of operating an autonomous vehicle in a view-obstructed environment while the autonomous vehicle is operating in an autonomous mode, the method comprising:
while the autonomous vehicle is operating in the autonomous mode:
identifying an information critical area along a travel route, the information critical area being related to a future driving action;
determining an occupant viewable area of an external environment;
determining whether at least a portion of the information critical area is located outside of the determined occupant viewable area; and
responsive to determining that at least a portion of the information critical area is located outside of the determined occupant viewable area, causing a modification to a current driving action of the autonomous vehicle,
wherein, in the autonomous mode, the autonomous vehicle is configured to navigate and maneuver itself without receiving input from a human driver such that the autonomous vehicle is fully autonomous, whereby the autonomous vehicle is driverless.

10. The method of claim 9, wherein causing a modification to a current driving action of the autonomous vehicle includes reducing a current speed of the autonomous vehicle.

11. The method of claim 10, wherein the current speed of the autonomous vehicle is reduced to a reduced speed, and wherein the reduced speed is maintained at least until the determined occupant viewable area of the informational critical area includes at least a substantial majority of the information critical area.

12. The method of claim 9, further including prompting a vehicle occupant for approval to implement the future driving action.

13. The method of claim 12, wherein, responsive to receiving an input corresponding to a vehicle occupant's approval to implement the future driving action, causing the autonomous vehicle to implement the future driving action.

14. A system for operating an autonomous vehicle in a view-obstructed environment while the autonomous vehicle is operating in an autonomous mode, the system comprising:
a processor, the processor being programmed to initiate executable operations comprising:
while the autonomous vehicle is operating in the autonomous mode:
identifying an information critical area along a travel route, the information critical area being related to a future driving action;
determining an occupant viewable area of an external environment;
determining whether at least a portion of the information critical area is located outside of the determined occupant viewable area; and
responsive to determining that at least a portion of the information critical area is located outside of the determined occupant viewable area, causing a modification to a current driving action of the autonomous vehicle,
wherein, in the autonomous mode, the autonomous vehicle is configured to navigate and maneuver itself without receiving input from a human driver such that the autonomous vehicle is fully autonomous, whereby the autonomous vehicle is driverless.

15. The system of claim 14, wherein causing a modification to a current driving action of the autonomous vehicle includes causing a current speed of the autonomous vehicle to be reduced.

16. The system of claim 15, wherein the current speed of the autonomous vehicle is reduced to a reduced speed, and wherein the executable operations further include maintaining the reduced speed at least until the determined occupant viewable area of the informational critical area includes at least a substantial majority of the information critical area.

17. The system of claim 14, wherein the executable operations further include:
prompt a vehicle occupant for approval to implement the future driving action.

18. The system of claim 17, wherein the executable operations further include:
  responsive to receiving an input corresponding to a vehicle occupant's approval to implement the future driving action, causing the autonomous vehicle to implement the future driving action.

\* \* \* \* \*